US012739577B2

(12) United States Patent
Matsumoto et al.

(10) Patent No.: US 12,739,577 B2
(45) Date of Patent: Sep. 15, 2026

(54) INFORMATION PROCESSING METHOD AND INFORMATION PROCESSING SYSTEM

(71) Applicant: Sony Group Corporation, Tokyo (JP)

(72) Inventors: Kyosuke Matsumoto, Kanagawa (JP); Kenichi Makino, Kanagawa (JP); Osamu Nakamura, Saitama (JP); Shinpei Tsuchiya, Saitama (JP)

(73) Assignee: Sony Group Corporation, Tokyo (JP)

( * ) Notice: Subject to any disclaimer, the term of this patent is extended or adjusted under 35 U.S.C. 154(b) by 311 days.

(21) Appl. No.: 18/569,211

(22) PCT Filed: Feb. 28, 2022

(86) PCT No.: PCT/JP2022/008114

§ 371 (c)(1),
(2) Date: Dec. 11, 2023

(87) PCT Pub. No.: WO2022/264535

PCT Pub. Date: Dec. 22, 2022

(65) Prior Publication Data

US 2024/0267683 A1 Aug. 8, 2024

(30) Foreign Application Priority Data

Jun. 18, 2021 (JP) ................................ 2021-101400

(51) Int. Cl.
*H04R 25/00* (2006.01)

(52) U.S. Cl.
CPC .................................. *H04R 25/507* (2013.01)

(58) Field of Classification Search
CPC .. H04R 25/507; H04R 1/1083; H04R 25/558; H04R 25/70; G10L 21/0208; G10L 21/0264; G10L 21/0364
See application file for complete search history.

(56) References Cited

U.S. PATENT DOCUMENTS

| | | | |
|---|---|---|---|
| 6,449,372 | B1 | 9/2002 | Greminger |
| 2010/0183161 | A1 | 7/2010 | Boretzki |

(Continued)

FOREIGN PATENT DOCUMENTS

| | | | |
|---|---|---|---|
| JP | 2002-534934 | A | 10/2002 |
| JP | 2018-033128 | A | 3/2018 |

(Continued)

OTHER PUBLICATIONS

International Search Report and English translation thereof mailed May 17, 2022 in connection with International Application No. PCT/JP2022/008114.

(Continued)

*Primary Examiner* — Mark Fischer
(74) *Attorney, Agent, or Firm* — Wolf, Greenfield & Sacks, P.C.

(57) ABSTRACT

An information processing method for an information processing system (1) according to the present disclosure includes a processed sound generation step and an adjustment step. In the processed sound generation step, the processed sound is generated by acoustic processing using a parameter that changes a sound collection function or a hearing aid function of a sound output unit. In the adjustment step, the sound output unit is adjusted by a parameter selected on the basis of a parameter used for the acoustic processing and feedback on the processed sound output from the sound output unit.

19 Claims, 20 Drawing Sheets

(56) References Cited

U.S. PATENT DOCUMENTS

| | | | | |
|---|---|---|---|---|
| 2011/0075858 | A1* | 3/2011 | Chihara | H04R 3/005 381/92 |
| 2015/0271607 | A1 | 9/2015 | Sabin | |
| 2018/0007477 | A1 | 1/2018 | Vries et al. | |
| 2021/0092534 | A1 | 3/2021 | Fichtl | |
| 2021/0195343 | A1* | 6/2021 | Aubreville | G06F 3/0482 |
| 2022/0378330 | A1* | 12/2022 | Kim | A61B 5/744 |

FOREIGN PATENT DOCUMENTS

| | | | |
|---|---|---|---|
| WO | WO 2016/167040 | A1 | 10/2016 |
| WO | WO 2020/217359 | A1 | 10/2020 |

OTHER PUBLICATIONS

International Written Opinion and English translation thereof mailed May 17, 2022 in connection with International Application No. PCT/JP2022/008114.

International Preliminary Report on Patentability and English translation thereof mailed Dec. 28, 2023 in connection with International Application No. PCT/JP2022/008114.

Extended European Search Report issued Sep. 20, 2024 in connection with European Application No. 22824535.3.

* cited by examiner

INFORMATION PROCESSING METHOD AND INFORMATION PROCESSING SYSTEM

CROSS-REFERENCE TO RELATED APPLICATIONS

The present application claims the benefit under 35 U.S.C. § 371 as a U.S. National Stage Entry of International Application No. PCT/JP2022/008114, filed in the Japanese Patent Office as a Receiving Office on Feb. 28, 2022, which claims priority to Japanese Patent Application Number JP2021-101400, filed in the Japanese Patent Office on Jun. 18, 2021, each of which applications is hereby incorporated by reference in its entirety.

FIELD

The present disclosure relates to an information processing method and an information processing system.

BACKGROUND

There is a device that causes a user to listen to environmental sounds in an external environment in a preferable manner by adjusting parameters of external sound capture functions of a head-mounted acoustic device such as a hearing aid, sound collector, and earphone (e.g., see Patent Literature 1).

The hearing aid needs to be adjusted in accordance with individual listening characteristics and use cases. Therefore, in general, the parameters have been adjusted while an expert counsels the user about the hearing aid.

CITATION LIST

Patent Literature

Patent Literature 1: WO 2016/167040 A1

SUMMARY

Technical Problem

However, parameter adjustment by a person such as the expert leads to a problem that adjustment results are different between the experiences of the person who has adjusted the parameters.

Therefore, the present disclosure proposes an information processing method and an information processing system that are configured to provide suitable adjustment of parameters of a hearing aid without being affected by human experience.

Solution to Problem

An information processing method for an information processing system according to the present disclosure includes a processed sound generation step and an adjustment step. In the processed sound generation step, the processed sound is generated by acoustic processing using a parameter that changes a sound collection function or a hearing aid function of a sound output unit. In the adjustment step, the sound output unit is adjusted by a parameter selected on the basis of a parameter used for the acoustic processing and feedback on the processed sound output from the sound output unit.

DESCRIPTION OF EMBODIMENTS

Figure 1:
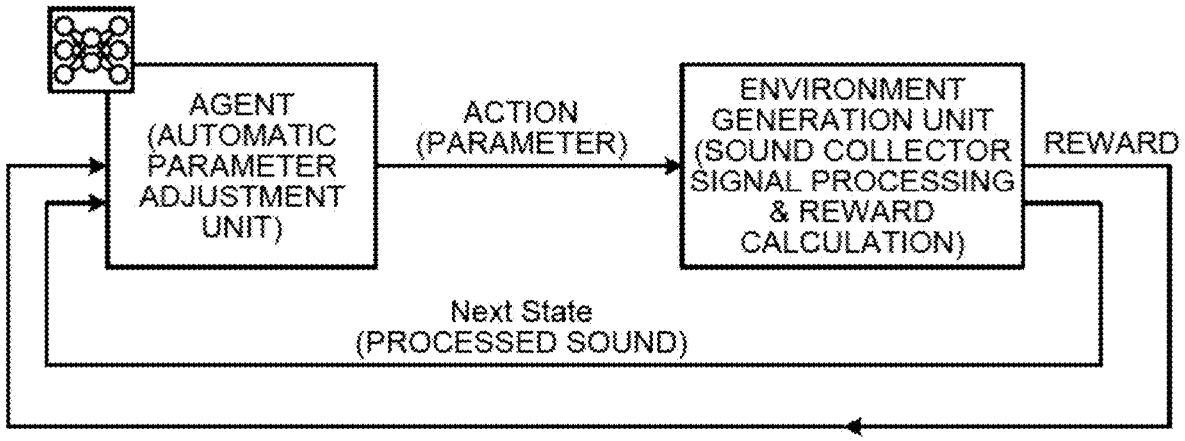
FIG. 1 is a diagram illustrating a basic learning model of the present disclosure.

Embodiments of the present disclosure will be described in detail below with reference to the drawings. Note that in the following embodiments, the same portions are denoted by the same reference numerals or symbols, and a repetitive description thereof will be omitted.

1. Overview of Information Processing System

An information processing system according to the present embodiment is a device that performs fully automatically or semi-automatically performed parameter adjustment (hereinafter, also referred to as "fitting") for changing hearing aid functions, for example, for a sound output device such as a hearing aid, a sound collector, or an earphone having an external sound capturing function. Hereinafter, fitting of the hearing aid performed by the information processing system will be described, but a target for parameter adjustment may be another sound output device such as the sound collector or the earphone having the external sound capturing function.

The information processing system performs the fitting of the hearing aid by using reinforcement learning which is an example of machine learning. The information processing system includes an agent that asks a question in order to collect data for acquiring a method of predicting a "reward" in the reinforcement learning.

The agent conducts an A/B test for a hearing aid wearer (hereinafter, described as "user"). The A/B test is a test of making the user listen to voice A and voice B and asking the user to answer which of the voice A and the voice B the user prefers. Note that the sound that the user is to listen to are not limited to two types of the voice A and the voice B, and may be three or more types of voices.

As a method of answering the A/B test, for example, a user interface (UI) is used. For example, the UI, such as a smartphone, a smartwatch, or the like is caused to display a button for selecting A or B so that the user can select A or B by operating the button. The UI may display a button for selecting "no difference between A and B".

In addition, the UI may be a button for providing feedback only when the voice B (output signal) obtained according to a new parameter is more preferable than the voice A being an output signal obtained according to an original parameter. Furthermore, the UI may be configured to receive an answer from the user by the user's action such as nodding the head.

Furthermore, the information processing system may be also configured to collect, as data, the user's voices before and after adjustment by the user, from an electric product (e.g., smartphone, television, etc.) around the user, and perform reinforcement learning on the basis of the collected data.

As a method of acquiring reward prediction data from other than the A/B test, for example, acquisition of voice and parameters before correction and voice and parameters after correction upon an operation involving adjustment of the voice is used, for data for training a reward predictor.

Furthermore, in the A/B test, the information processing system performs fitting of the hearing aid while causing the UI to display the agent represented by an avatar of a person, a character, or the like, and the agent to have a role of, for example, an audiologist to interact with the user.

2. Background

Hearing aids have various processing for signal processing. Most typically, signal processing is "compressor (non-linear amplification)" processing. Therefore, unless otherwise specified, adjustment of parameters in the compressor processing will be described below.

For a hearing aid, the compressor is normally adjusted by an audiologist at a hearing aid shop or the like. The audiologist first performs audiometry on the user to obtain an audiogram. Next, the audiologist inputs the audiogram into a fitting formula (e.g., NAL-NL, DSL, etc.) to acquire recommended adjustment values of the compressor.

Then, the audiologist causes the user to wear the hearing aid to which the recommended adjustment values of the compressor are applied, for hearing trial and counseling. The audiologist finely adjusts the values of the compressor based on his/her knowledge to resolve the dissatisfaction of the user.

However, the fitting of the hearing aid by the audiologist has the following problems. For example, the costs for manned support from the audiologist and the like increase. In addition, the fitting greatly depends on the experience of a person who performs adjustment and person who receives adjustment, often leading to dissatisfaction in adjustment. In addition, infrequent adjustment limits fine adjustment. Furthermore, it is difficult to resolve user's dissatisfaction with hearing in a timely manner.

Therefore, the present embodiment proposes an information processing system and an information processing method that are configured so that parameters of a hearing aid are adjusted by the information processing system without intervention of any audiologist and suitably adjust the parameters of the hearing aid without being affected by human experience.

There is reinforcement learning for a method to achieve this object. The reinforcement learning is a method to "find how the actions to determine using policy in order to maximize the total sum of rewards to be obtained in the future".

Here, when typical reinforcement learning is applied to the adjustment of a compressor, a basic learning model can be achieved by a configuration illustrated in FIG. 1. In this configuration, a state s in the reinforcement learning becomes an acoustic signal (processed sound) processed using a certain parameter. The agent serves as an automatic parameter adjustment unit that selects one action a (=compressor parameter setting value) on the basis of a state input at the moment.

Furthermore, the environment in the reinforcement learning obtains s' by processing a voice signal with the compressor parameter a selected by the agent. Furthermore, the following reward is obtained. The reward is a score r (s', a, s) that indicates how much the user likes parameter change performed by the agent.

The problem to be solved by reinforcement learning is to acquire a policy $\pi$ (a|s) for maximizing a total value of the rewards obtained when continuing the interaction between the agent and the environment (reward, action, and state exchange) for a time period having a certain length. This problem can be solved by a general reinforcement learning methodology as long as a reward function r can be appropriately designed.

However, "how much individual users like the parameter change" is unknown, and this problem cannot be solved by the above approach. This is because it is impractical for human to give rewards for all trials in a learning process involving a huge number of trials.

3. Schematic Configuration of Information Processing System

Figure 2:
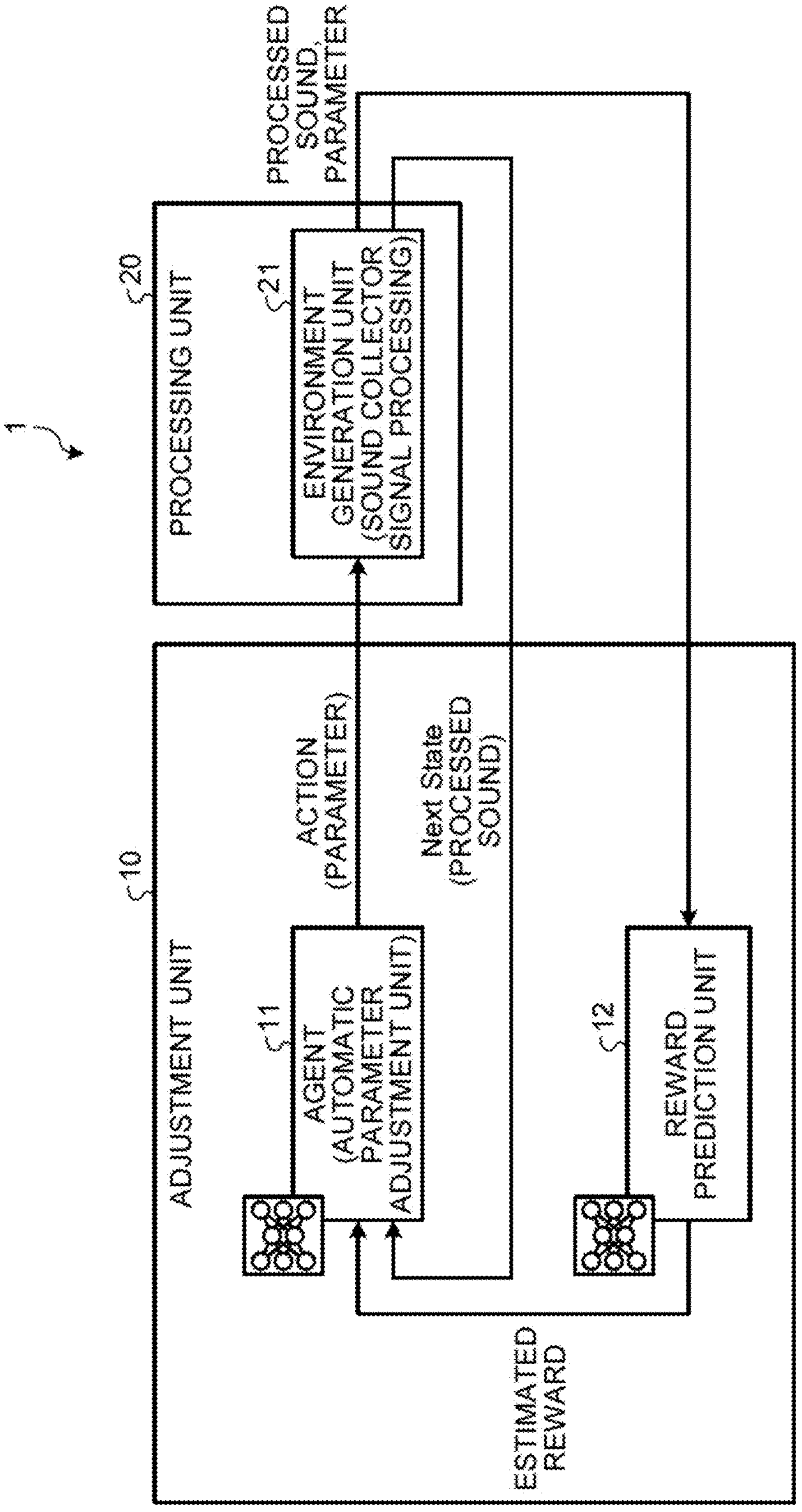
FIG. 2 is a diagram illustrating an exemplary schematic configuration of an information processing system according to an embodiment of the present disclosure.

Therefore, as illustrated in FIG. 2, an information processing system 1 according to an embodiment includes an adjustment unit 10 and a processing unit 20. The processing unit 20 includes an environment generation unit 21. The environment generation unit 21 has a function of generating the processed sound by acoustic processing (sound collector signal processing) using a parameter changing the hearing aid function of the hearing aid and causing the hearing aid to output the processed sound.

The adjustment unit 10 acquires the parameter used for the acoustic processing and a reaction as feedback on the processed sound from the user who has listened to the processed sound, for machine learning of a selection method for a parameter suitable for the user, and adjusts the hearing aid which is an example of a sound output unit according to the parameter selected by the selection method.

The adjustment unit 10 includes an agent 11 and a reward prediction unit 12. The agent 11 performs the machine learning of the selection method for a parameter suitable for the user, on the basis of the input processed sound and reward, and outputs the parameter selected by the selection method, to the processing unit 20, as illustrated in FIG. 1.

The processing unit 20 outputs the processed sound after acoustic processing according to the input parameter to the agent 11 and the reward prediction unit 12. Furthermore, the processing unit 20 outputs the parameter used for the acoustic processing to the reward prediction unit 12.

The reward prediction unit 12 performs machine learning for predicting the reward instead of the user on the basis of the processed sounds and parameters which are sequentially input, and outputs the predicted reward to the agent 11. Therefore, the agent 11 can suitably adjust the parameter of the hearing aid without intervention of the audiologist or without a huge number of trials of the A/B test by the user.

4. Learning and Adjustment Process

The reward prediction unit 12 acquires a voice signal for evaluation. In the present embodiment, a data set of an input voice (processed sound) used for the parameter adjustment is determined, and the processed sound and the parameter used for the acoustic processing of the processed sound are input to the reward prediction unit 12 at random. The reward prediction unit 12 predicts the reward from the input processed sound and parameter, and outputs the reward to the agent 11.

The agent 11 selects an action (parameter) suitable for the user on the basis of the input reward and outputs the selected action to the processing unit 20. The processing unit 20 acquires (updates) parameters θ1 and θ2, on the basis of the action obtained from the agent 11.

In the present embodiment, signal processing on the target for adjustment is 3-band multiband compressor processing. It is assumed that the compression rate of each band takes, for example, three values of −2, +1, and +4 from a standard value.

The standard value is a value of the compression rate calculated from the audiogram using the fitting formula. In an example of 3 ways×3 bands, output from the agent 11 takes nine values. The processing unit 20 applies signal processing with each parameter to the acquired voice.

In this parameter adjustment step, the object is to "train the reward prediction unit 12 and the agent 11 for the voices input every moment, select, for a given input, a parameter set that the user seems to like most, from nine possible parameter sets, enabling voice processing".

In the learning process including the reward prediction unit 12, first, the reward prediction unit 12 is trained by supervised learning, as preparation before reinforcement learning. It is considered that many users may have difficulty in listening to one sound source and absolutely evaluating the sound source, thus, considering an evaluation task of making the user listen to two sounds A and B and asking the user to answer which is easier to hear, here.

Figure 3:
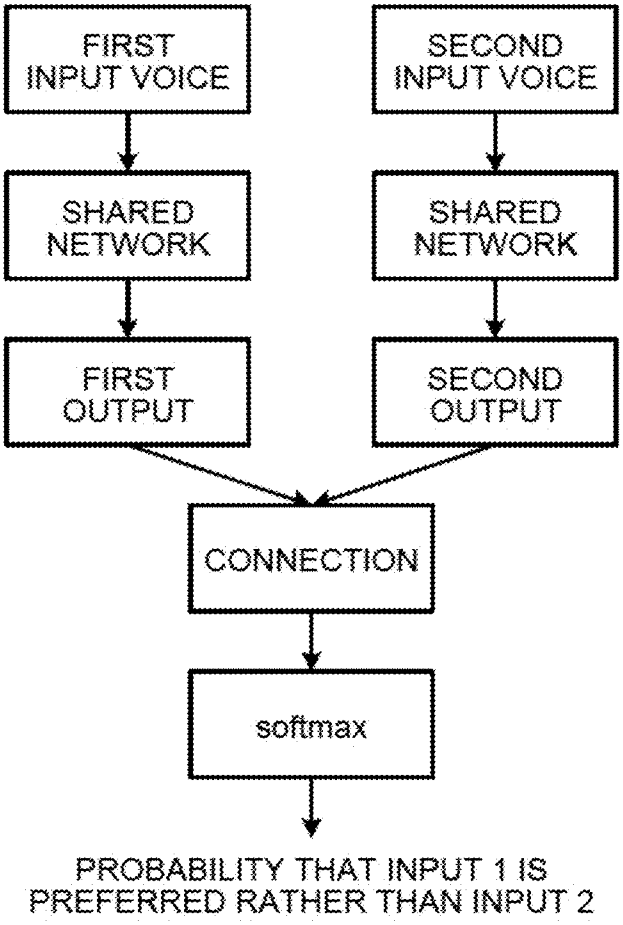
FIG. 3 is a diagram illustrating an example of a deep neural network according to an embodiment of the present disclosure.
Figure 4:
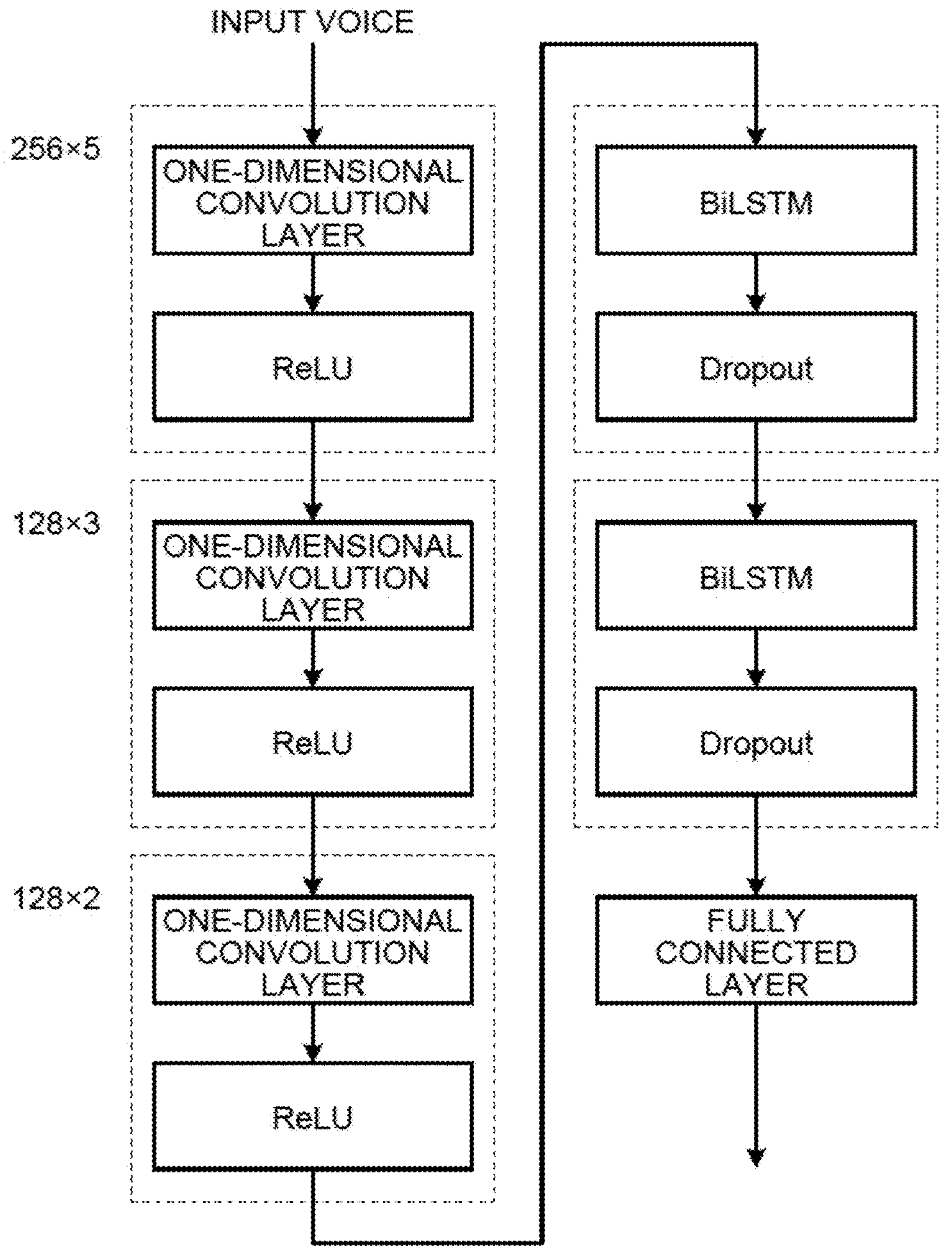
FIG. 4 is a diagram illustrating an example of a deep neural network according to an embodiment of the present disclosure.

FIGS. 3 and 4 are each a specific example of a deep neural network that learns user's answering behavior in this task. A first input voice and a second input voice illustrated in FIG. 3 are obtained by performing signal processing on one voice signal by using two compression parameter sets θ1 and θ2, respectively. Note that the first input voice and the second input voice illustrated in FIG. 3 may be converted into amplitude spectrum/logmel spectrum or the like of short-time Fourier transform as preprocessing.

The first input voice and the second input voice are each input to a shared network illustrated in FIG. 4. The first output and the second output that are each output from the shared network are input to a fully connected layer and connected, and input to a softmax function.

In FIG. 3, the reward prediction unit 12 outputs a probability that the first input voice is preferred rather than the second input voice. The following λ is used as training data for the output. λ=(λ1,λ2)=1,0) represents that the first input voice is preferable, λ=(λ1,λ2)=(0,1) represents that the second input voice is preferable, λ=(λ1,λ2)=(0.5,0.5) represents that both of the first input voice and the second input voice are within an allowable range and there is no difference in feeling, and λ=(λ1,λ2)=(0,0) represents that both of the first input voice and the second input voice are out of the allowable range. However, λ=(λ1,λ2)=(0,0) may not be used for learning.

At this time, the network in FIG. 3 can be optimized by learning to minimize cross entropy L=−Σ(λ1 log P+λ2(1−P)) of the training data. Here, P is an output from the network. In addition, the parameters θ1 and θ2 are generated at random from among possible options. This is because the reinforcement learning process is not yet performed and an appropriate input cannot be obtained from the agent 11.

In the above learning, unlike a general use case of model construction of supervised learning, it is necessary to learn the preferences of individual users. Therefore, although it is necessary to take some time to acquire data after purchase of the hearing aid, it is not always necessary to fully complete learning at this time, because the reward prediction unit 12 has an opportunity of further update, as described later.

Next, normal reinforcement learning will be described. The reward prediction unit 12 obtained by the above learning is used to repeatedly update the agent 11 by typical reinforcement learning. First, an objective function in the reinforcement learning is expressed by the following formula (1).

$$E\left[\sum_{\infty 0}\gamma_t r(s_t, a_t, s_{t+1})\right] \tag{1}$$

Here, when conditional expectation is represented by the following formula (2)

$$Q(s, a) = E\left[\sum_{\infty 0}\gamma_t r(s_t, a_t, s_{t+1}) | s_0 = s, a_0 = a\right] \tag{2}$$

the policy by which maximization of the objective function at the time t=0 is given by the following formula (3).

$$\pi(a|s) = \text{argmax}\pi Q(s, a; \phi) \quad (3)$$

Note that the policy π may be, for example, a model given by the following formula (4)

$$a = \text{argmax}_a Q(s, a; \phi) \quad (4)$$

or a model having a temperature parameter such as softmax policy may be selected.

Figure 5:
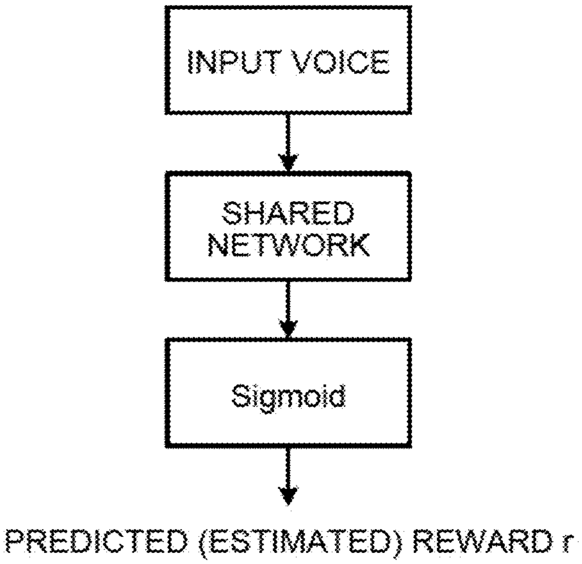
FIG. 5 is a diagram illustrating a reward prediction unit according to an embodiment of the present disclosure.

The update of the agent in the reinforcement learning is given below. 1. The policy π is initialized by, for example, uniform distribution or the like. 2. Hereinafter, the following steps are repeated. (a) The action (=compression parameter) is determined according to the current policy, and a reward value for the current state is calculated using the reward predictor (reward prediction unit 12) illustrated in FIG. 5. Then, the action (=compression parameter) is input to the environment to obtain the next state. Thereafter, (b) an action value function=Q for the next state is estimated, and (c) the policy is updated using the estimated Q.

There are various reinforcement learning methods depending on how to perform (b) and (c) described above. Here, Q-learning is described as an example. Note that the reinforcement learning method for implementing (b) and (c) described above is not limited to the Q-learning.

In the Q-learning, a Q-value of the next step is given by the following formula (5)

$$y_t = r(s_t, a_t) + \gamma \max_{a'} Q(s't, a't) \quad (5)$$

from the definition of Q(s, a; Φ). Now, assuming that this Q function is modeled by using, for example, a convolutional neural network (CNN), the parameter Φ of the (Deep Q-network) CNN can be updated by the following formula (6).

$$\phi = \text{argmax}_\phi \|Q(s_t, a_t; \phi) - y_t\|_2 \quad (6)$$

Figure 6:
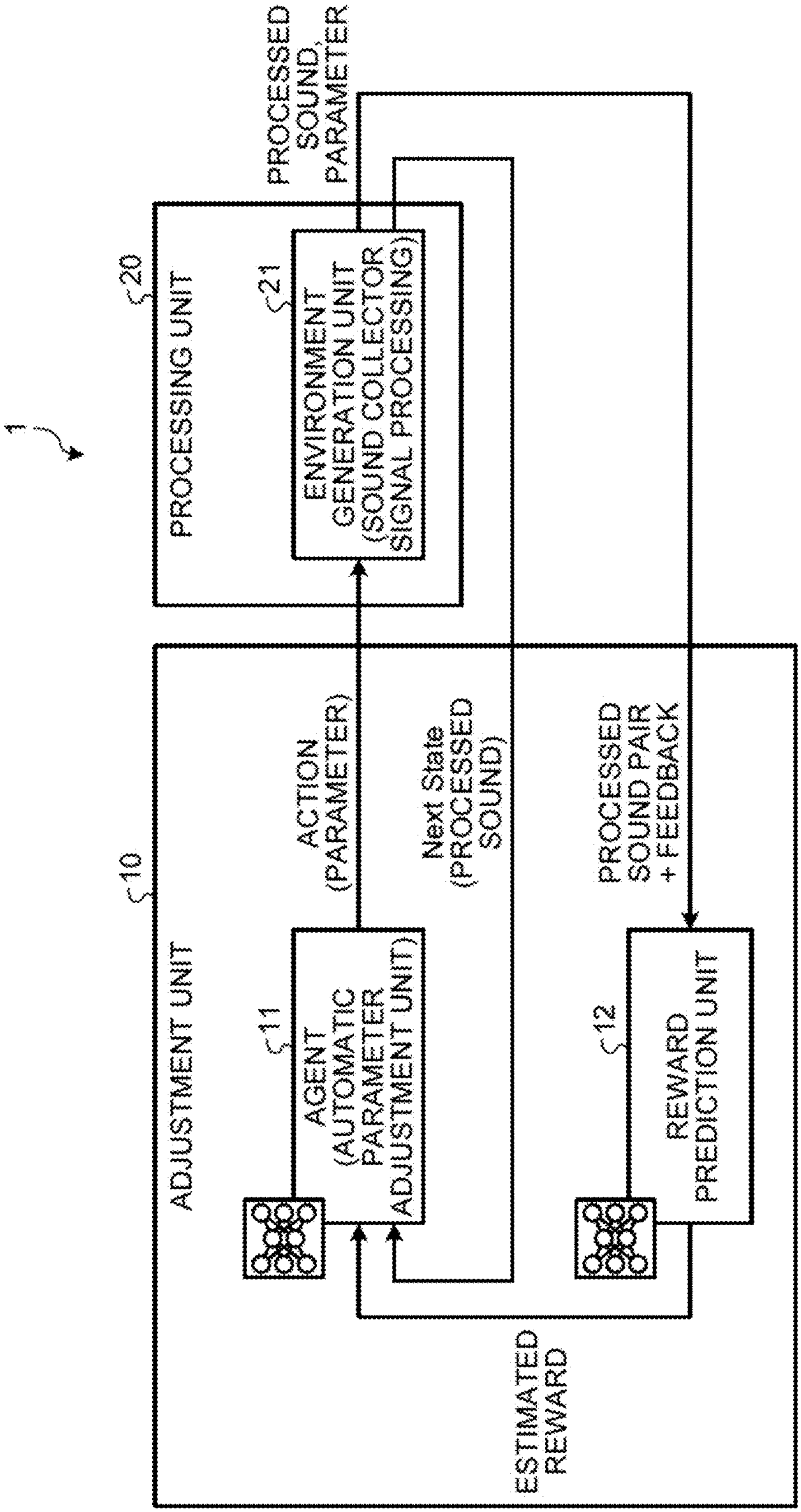
FIG. 6 is an explanatory diagram illustrating the operation of the information processing system according to an embodiment of the present disclosure.

The operation of the information processing system 1 in the present step will be illustrated in FIG. 6. As illustrated in FIG. 6, the action (=compression parameter) is determined according to the current policy, and the parameter is output to the processing unit 20. The processing unit 20 performs signal processing on a voice signal for learning, according to the input parameter and outputs the processed sound to the agent 11. In addition, the processing unit 20 outputs a pair of processed sounds (the first input voice and the second input voice) and the parameters to the reward prediction unit 12.

The reward prediction unit 12 estimates the reward from the pair of processed sounds and the parameters, and outputs the estimated reward to the agent 11. The agent 11 determines an optimal action (=compression parameter) on the basis of the input reward, and outputs the parameter to the processing unit 20. The information processing system 1 updates the agent 11 and the reward prediction unit 12 by reinforcement learning while repeating this operation.

Furthermore, when the feedback from the user is obtained, the information processing system 1 asynchronously updates the reward prediction unit 12. When the agent 11 is updated to some extent and it can be expected that the action value function or the policy has a proper value, the information processing system 1 can further obtain the user feedback to update the reward prediction unit 12.

In this case, unlike the first step, of the parameters θ1 and θ2 used for generating the first input voice and the second input voice, θ1 may be the parameter in the previous step and θ2 may be the parameter obtained from the agent 11 in the present step.

Figure 7:
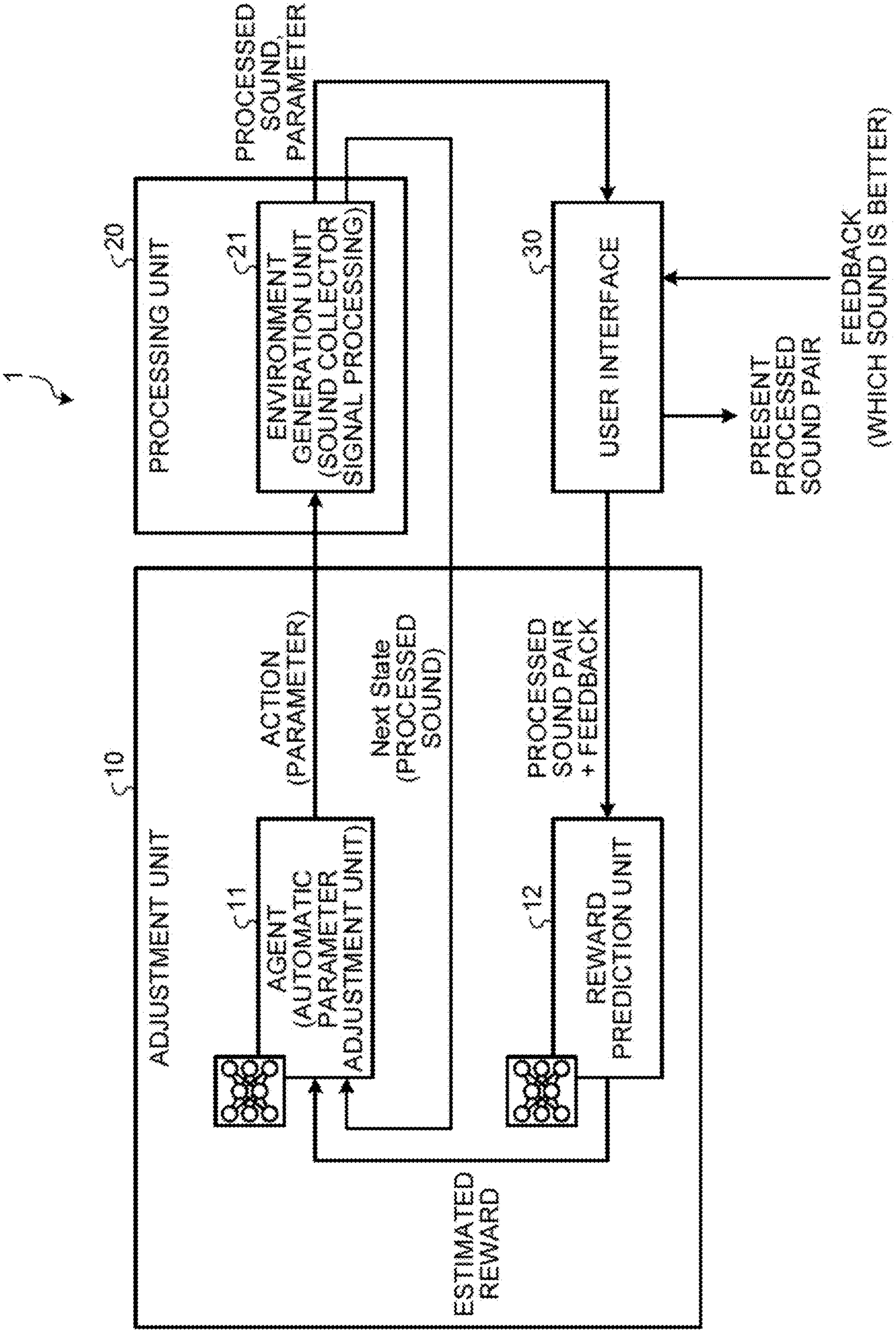
FIG. 7 is an explanatory diagram illustrating the operation of the information processing system according to an embodiment of the present disclosure.

The operation of the information processing system 1 in the present step will be illustrated in FIG. 7. As illustrated in FIG. 7, the information processing system 1 presents the pair of processed sounds output from the processing unit to the user through a user interface 30. Then, the information processing system 1 outputs feedback (reaction: which sound is better) on the processed sound from the user, which is input via the user interface 30, to the reward prediction unit 12 together with the pair of processed sounds. Other operations are similar to those illustrated in FIG. 6.

5. User Interface

Next, an example of the user interface according to the present disclosure will be described. The user interface is achieved by, for example, a display operation unit (e.g., touch screen display) of an external cooperation device such as a smartphone, smart watch, or personal computer.

In the external cooperation device, an application program (hereinafter, described as "adjustment application") for adjusting the parameter of the hearing aid is installed in advance. In addition, some functions for adjusting the parameter of the hearing aid may be implemented as functions of an operating system (OS) of the external cooperation device. When the user purchases the hearing aid or when the user is dissatisfied with the behavior of the hearing aid, the user operates the external cooperation device to launch the adjustment application.

Figure 8A:
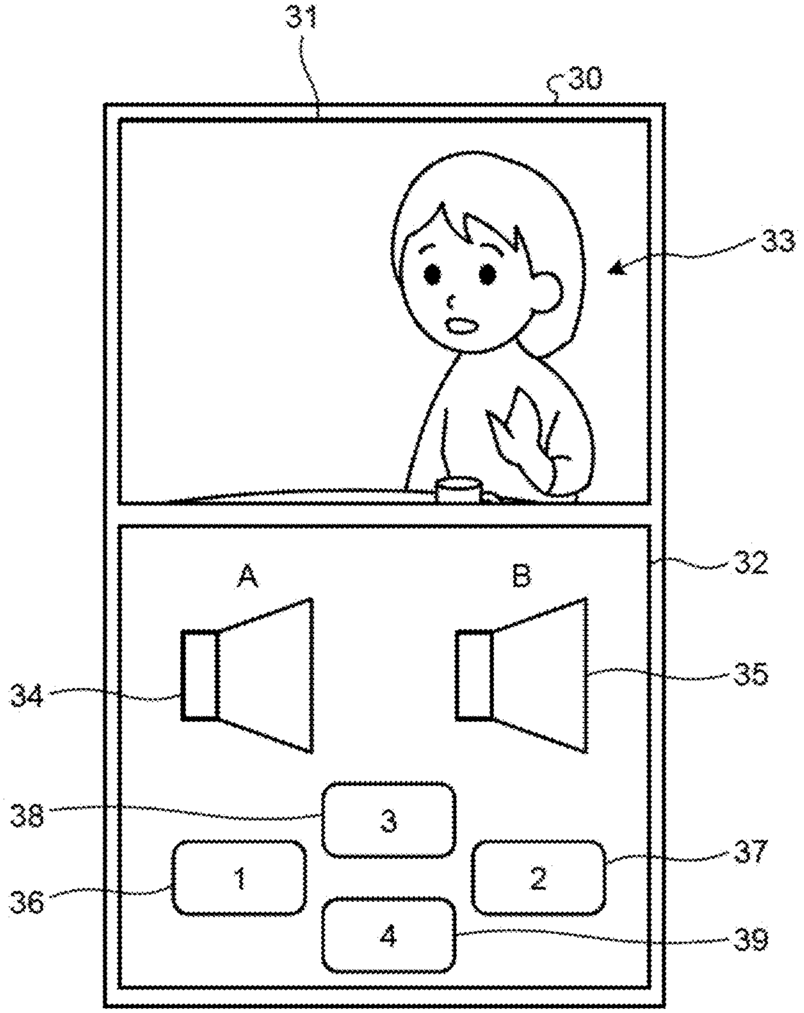
FIG. 8A is an explanatory diagram of a user interface according to an embodiment of the present disclosure.

Upon launching the adjustment application, the external cooperation device displays, for example, the user interface 30 illustrated in FIG. 8A. The user interface 30 includes a display unit 31 and an operation unit 32. On the display unit 31, an avatar 33 that speaks the processed sounds for adjustment is displayed.

The operation unit 32 includes sound output buttons 34 and 35 and numeral 1 to numeral 4 keys 36, 37, 38, and 39. When the user taps the sound output button 34, the avatar 33 speaks the voice A being the first input voice, and when the sound output button 35 is tapped, the avatar 33 speaks the voice B being the second input voice.

The user interface 30 outputs, to the reward prediction unit 12, feedback "the voice A is easy to listen to" when the numeral 1 key 36 is tapped, and outputs feedback "the voice B is easy to listen to" when the numeral 2 key 37 is tapped.

In addition, the user interface 30 outputs, to the reward prediction unit 12, feedback "no difference between the voice A and voice B, and both are within an allowable range" when the numeral 3 key 38 is tapped, and outputs feedback "there is no difference between the voice A and voice B, and both are uncomfortable" when the numeral 4 key 39 is tapped. As described above, according to the user interface 30, the A/B test can be easily conducted in an interactive mode with the avatar 33, regardless of where the user is.

Figure 8B:
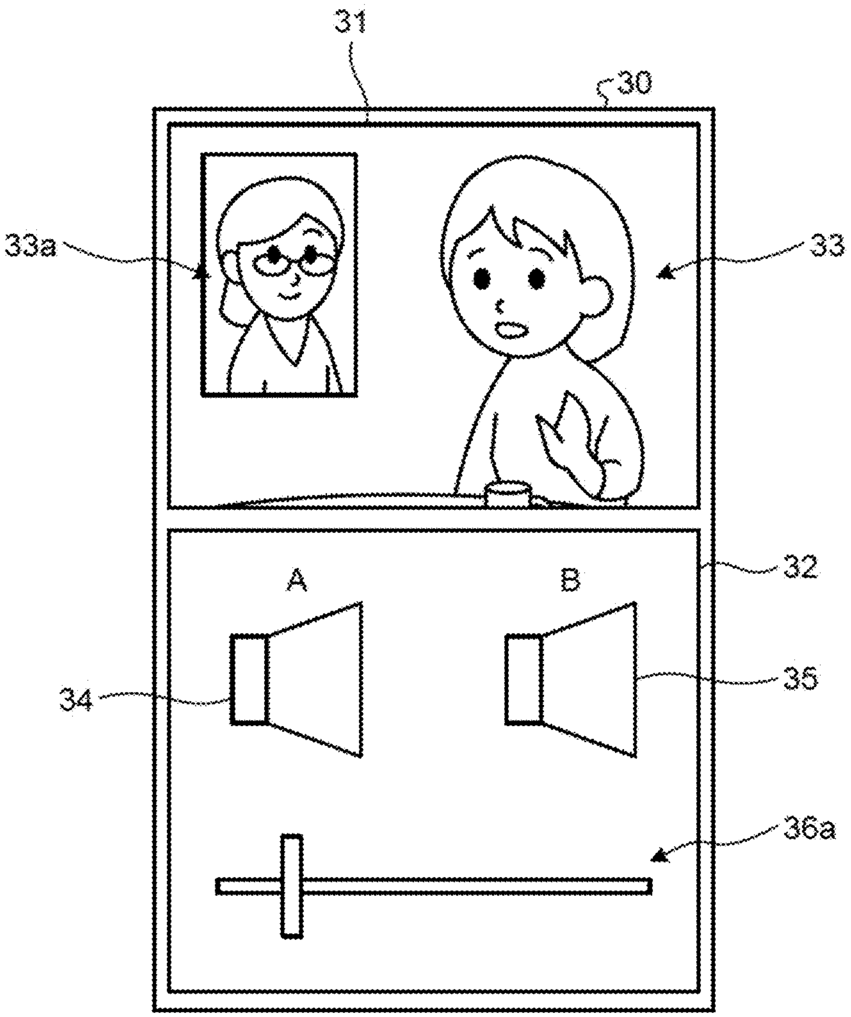
FIG. 8B is an explanatory diagram of a user interface according to an embodiment of the present disclosure.

The external cooperation device may display the user interface 30 illustrated in FIG. 8B. In the example illustrated in FIG. 8B, the display unit 31 is caused to display thereon an avatar 33*a* of an audiologist who is an expert in fitting hearing aids.

When the adjustment application is launched, the avatar 33*a* acts as a facilitator to conduct the adjustment of the hearing aid, for example, while asking the user, "Which is better, A or B?" or "Then, how about C?". In this manner, the interactive information presentation/option may be provided as if the agent that is a virtual audiologist, such as a photographed or animated audiologist, performs fitting procedure remotely on the adjustment application.

By using the user interface 30 as configured above, it can be expected to relieve the user's stress of repeated monotonous test or of failure in adjustment such as proposal of parameter setting with output of undesirable sound.

In addition, the user interface 30 illustrated in FIG. 8B displays a slider 36*a* instead of the numeral 1 to numeral 4 keys 36, 37, 38, and 39. This configuration makes it possible for the user to provide, as an answer, not a 0/1 answer but a continuous value between 0 and 1 as favorable sensitivity to the voice by using the slider 36*a* on the application.

For example, the slider 36*a* positioned in the middle of A and B (0.5) can provide an answer indicating that there is no difference in feeling between A and B and both are within the allowable range, and the slider 36*a* positioned near B (0.8) can provide an answer such as "I'd rather like B".

Note that a method of answering the A/B test using the adjustment application may use a voice answer such as "I like A" or "I like B". Furthermore, for example, in a case where the user interface 30 is configured so that the voice A is output first and then the voice B is output, the user may shake his/her head to show whether to accept the changed parameter. In addition, when nodding indicating acceptance is not shown, for a predetermined time period (e.g., 5 sec) after outputting sound, it may be regarded as rejection.

Note that, although the examples of the adjustment of the hearing aid and the acquisition of the user feedback, by using the external cooperation device have been described so far, the adjustment of the hearing aid and the acquisition of the feedback may be performed without using the external cooperation device. For example, the hearing aid may output the voice A, the voice B, and a voice guidance, for the user to input feedback by using a physical key, a contact sensor, a proximity sensor, an acceleration sensor, a microphone, or the like provided in the hearing aid body according to the voice guidance.

6. Outline of Adjustment System

Figure 9:
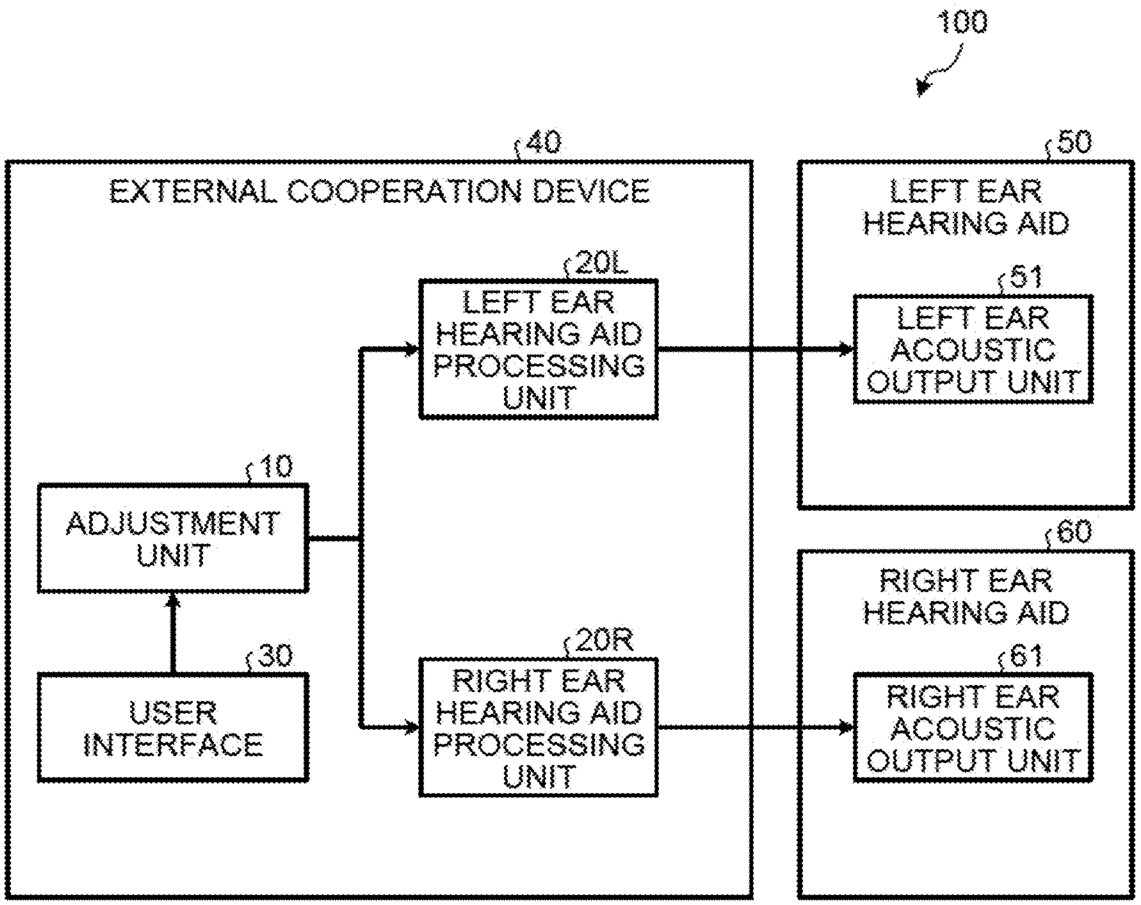
FIG. 9 is a schematic explanatory diagram of an adjustment system according to an embodiment of the present disclosure.

Next, an outline of an adjustment system according to the present disclosure will be described. Here, the external cooperation device having the function of the information processing system 1 will be described. As illustrated in FIG. 9, an external cooperation device 40 is communicably connected to a left ear hearing aid 50 and a right ear hearing aid 60 in a wired or wireless manner.

The external cooperation device 40 includes the adjustment unit 10, a left ear hearing aid processing unit 20L, a right ear hearing aid processing unit 20R, and a user interface 30 are provided. The adjustment unit 10, the left ear hearing aid processing unit 20L, and the right ear hearing aid processing unit 20R each include a microcomputer including a central processing unit (CPU), a read only memory (ROM), a random access memory (RAM), and the like, and various circuits.

The adjustment unit 10, the left ear hearing aid processing unit 20L, and the right ear hearing aid processing unit 20R function by the CPU executing the adjustment application stored in the ROM by using the RAM as a work area.

Note that some or all of the adjustment unit 10, the left ear hearing aid processing unit 20L, and the right ear hearing aid processing unit 20R may include hardware such as an application specific integrated circuit (ASIC) or a field programmable gate array (FPGA).

As described above, the user interface 30 is achieved by, for example, the touch panel display. The left ear hearing aid 50 includes a left ear acoustic output unit 51. The right ear hearing aid 60 includes a right ear acoustic output unit 61.

At least one of the left ear hearing aid 50 and the right ear hearing aid 60 may include an acoustic input unit which is not illustrated including a microphone or the like to collect surrounding sound. Furthermore, the acoustic input unit may be provided in a device communicably connected with the external cooperation device 40 or the other left ear hearing aid 50 and right ear hearing aid 60 in a wired or wireless manner. The left ear hearing aid 50 and the right ear hearing aid 60 perform compression processing on the basis of the surrounding sound acquired by the acoustic input unit. The surrounding sound acquired by the acoustic input unit may be used for noise suppression, beamforming, or a voice instruction input function, by the left ear hearing aid 50, the right ear hearing aid 60, or the external cooperation device 40.

The adjustment unit 10 includes the agent 11 and the reward prediction unit 12 (see FIG. 2), and outputs the parameter to the left ear hearing aid processing unit 20L and the right ear hearing aid processing unit 20R. The left ear hearing aid processing unit 20L and the right ear hearing aid processing unit 20R generate the processed sounds by acoustic processing using the input parameters, and output the processed sounds to the left ear hearing aid 50 and the right ear hearing aid 60.

The left ear acoustic output unit 51 and the right ear acoustic output unit 61 output the processed sounds input from the external cooperation device 40. The user interface 30 receives feedback (which sound of A and B is better) from the user who has listened to the processed sounds, and outputs the feedback to the adjustment unit 10. The adjustment unit 10 selects a more appropriate parameter on the basis of the feedback, and outputs the parameter to the left ear hearing aid processing unit 20L and the right ear hearing aid processing unit 20R.

When determining an optimum parameter after repeating such operations, the external cooperation device 40 sets the parameter for the left ear hearing aid 50 by the left ear hearing aid processing unit 20L, sets the parameter for the right ear hearing aid 60 by the right ear hearing aid processing unit 20R, and finishes the parameter adjustment.

7. Processing Performed by Information Processing System

Figure 10:
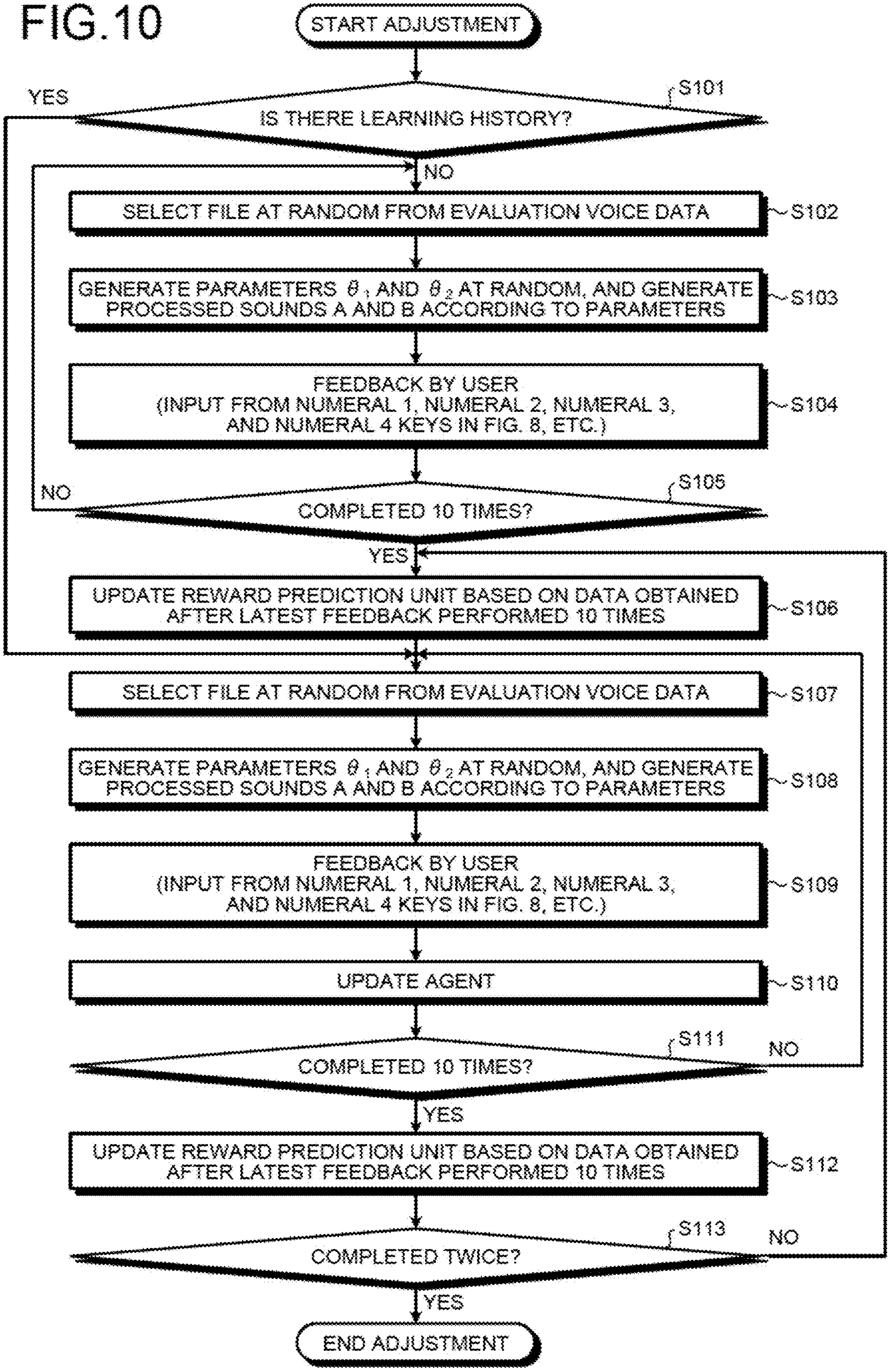
FIG. 10 is a flowchart illustrating an example of a process performed by the information processing system according to an embodiment of the present disclosure.

Next, an example of processing performed by the information processing system 1 will be described. As illustrated in FIG. 10, when the adjustment application is activated, the information processing system 1 first determines whether there is a learning history (Step S101).

When it is determined that there is the learning history (Step S101, Yes), the information processing system 1 proceeds to Step S107. In addition, when it is determined that there is no learning history (Step S101, No), the information processing system 1 selects a file from evaluation voice data (Step S102), generates the parameters θ1 and θ2 at random, generates the processed sounds A and B according to the parameters to output the processed sounds, and performs the A/B test (Step S104).

Thereafter, the information processing system 1 acquires the feedback (e.g., inputs from the numeral 1, numeral 2, numeral 3, and numeral 4 keys illustrated in FIG. 8A, etc.) by the user (Step S104), and determines whether the A/B test has been completed 10 times (Step S105).

When it is determined that the A/B test has not been completed 10 times (Step S105, No), the information processing system 1 proceeds to Step S102. When it is determined that the A/B test has been completed 10 times (Step S105, Yes), the adjustment unit 10 updates the reward prediction unit 12 on the basis of data obtained after the latest feedback performed 10 times (Step S106).

Subsequently, the information processing system 1 selects a file from the evaluation data at random (Step S107), generates the parameters θ1 and θ2 at random, generates the processed sounds A and B according to the parameters to output the processed sounds, and performs the A/B test (Step S108).

Thereafter, the information processing system 1 acquires the feedback (e.g., inputs from the numeral 1, numeral 2, numeral 3, and numeral 4 keys illustrated in FIG. 8A, etc.) by the user (Step S109), and updates the agent 11 (Step S110).

Subsequently, the information processing system 1 determines whether the A/B test has been completed 10 times (Step S111). When it is determined that the A/B test has not been completed 10 times (Step S111, No), the information processing system 1 proceeds to Step S107.

When it is determined that the A/B test has been completed 10 times (Step S111, Yes), the adjustment unit 10 updates the reward prediction unit 12 on the basis of data obtained after the latest feedback performed 10 times (Step S112), and determines whether the processing of Steps S106 to S112 has been completed twice (Step S113).

When it is determined that the processing of Steps S106 to S112 has not been completed twice (Step S113, No), the information processing system 1 proceeds to Step S106. In addition, it is determined that the processing of Steps S106 to S112 has been completed twice (Step S113, Yes), the information processing system 1 finishes the parameter adjustment.

Figure 11:
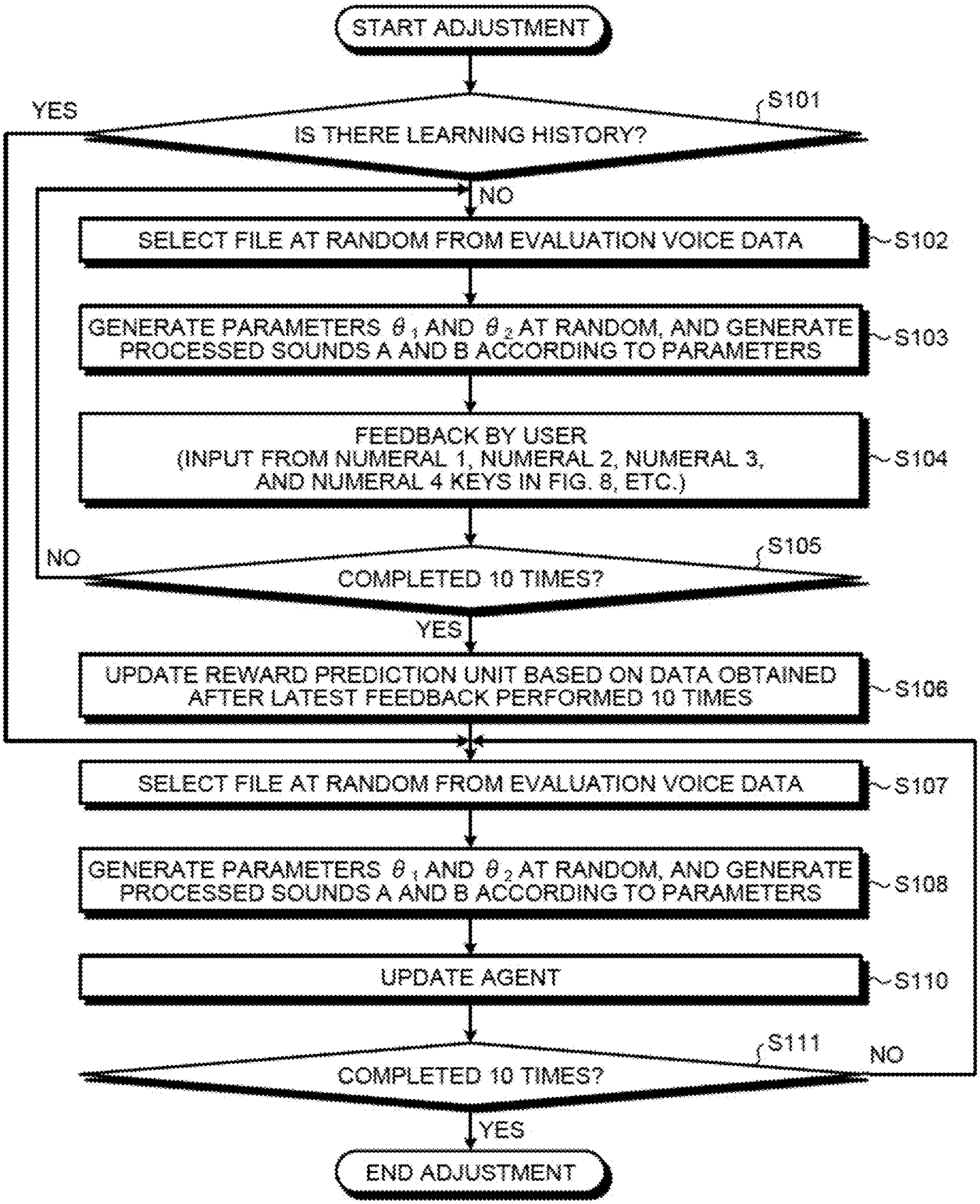
FIG. 11 is a flowchart illustrating an example of a process performed by the information processing system according to an embodiment of the present disclosure.

Note that, it is troublesome to input feedback in each time of the A/B test, and therefore, the information processing system 1 can also perform the simplified processing as illustrated in FIG. 11. Specifically, as illustrated in FIG. 11, the information processing system 1 can also perform processing in which Steps S109, S112, and S113 are omitted from the processing illustrated in FIG. 10.

However, performing the processing illustrated in FIG. 11 may lead to a poor learning result with an output that is separated from an actual user's taste due to insufficient learning of the reward prediction unit 12. Therefore, the information processing system 1 may impose a limitation so that the process illustrated in FIG. 11 cannot be continuously performed.

8. Other Examples

The embodiments described above are merely examples, and various modifications can be made. For example, the information processing method according to the present disclosure can be applied not only to compression but also to noise suppression, feedback cancellation, automatic parameter adjustment for emphasis of a specific direction by beamforming, and the like.

Upon parameter adjustment for a plurality of types of parameters, the information processing system 1 can learn a plurality of signal processing parameters in one reinforcement learning process, but can also perform the reinforcement learning process in parallel for each parameter subset. For example, the information processing system 1 can separately perform an A/B test and learning process for noise suppression, and a learning process for an A/B test for compression parameters.

In addition, the information processing system 1 can increase the number of condition variables in learning. For example, a separate test, a separate agent 11, and a separate reward prediction unit 12 may be provided for each of several scenes, for individual learning.

[8-1. Obtaining Indirect User Feedback]

The information processing system 1 can also acquire indirect user feedback via an application that adjusts some parameters of the hearing aid.

Figure 12:
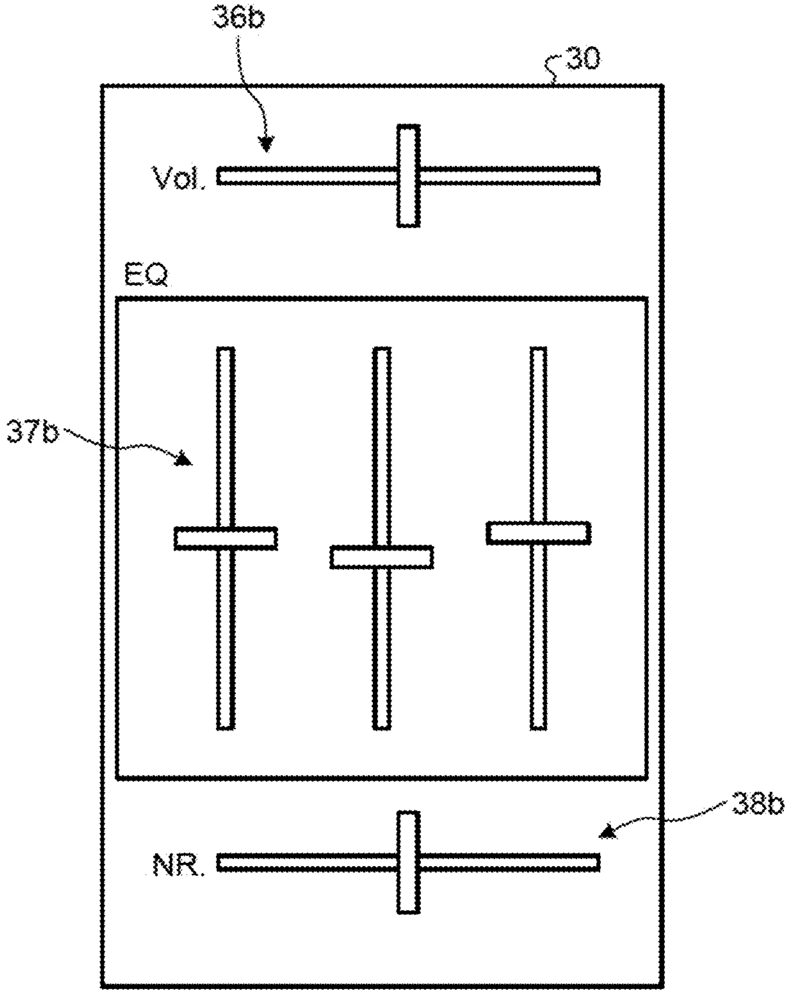
FIG. 12 is an explanatory diagram of a user interface according to an embodiment of the present disclosure.

Depending on the hearing aid, for example, a smartphone or the like may provide a function of directly or indirectly adjusting some parameters of the hearing aid. FIG. 12 is an example of the user interface 30 that can adjust some parameters of the hearing aid.

As illustrated in FIG. 12, the user interface 30 includes a slider 36*b* that receives a volume adjustment operation, a slider 37*b* that receives the adjustment operation for a three-band equalizer, and a slider 38*b* that receives an adjustment operation for the strength of a noise suppression function.

Figure 13:
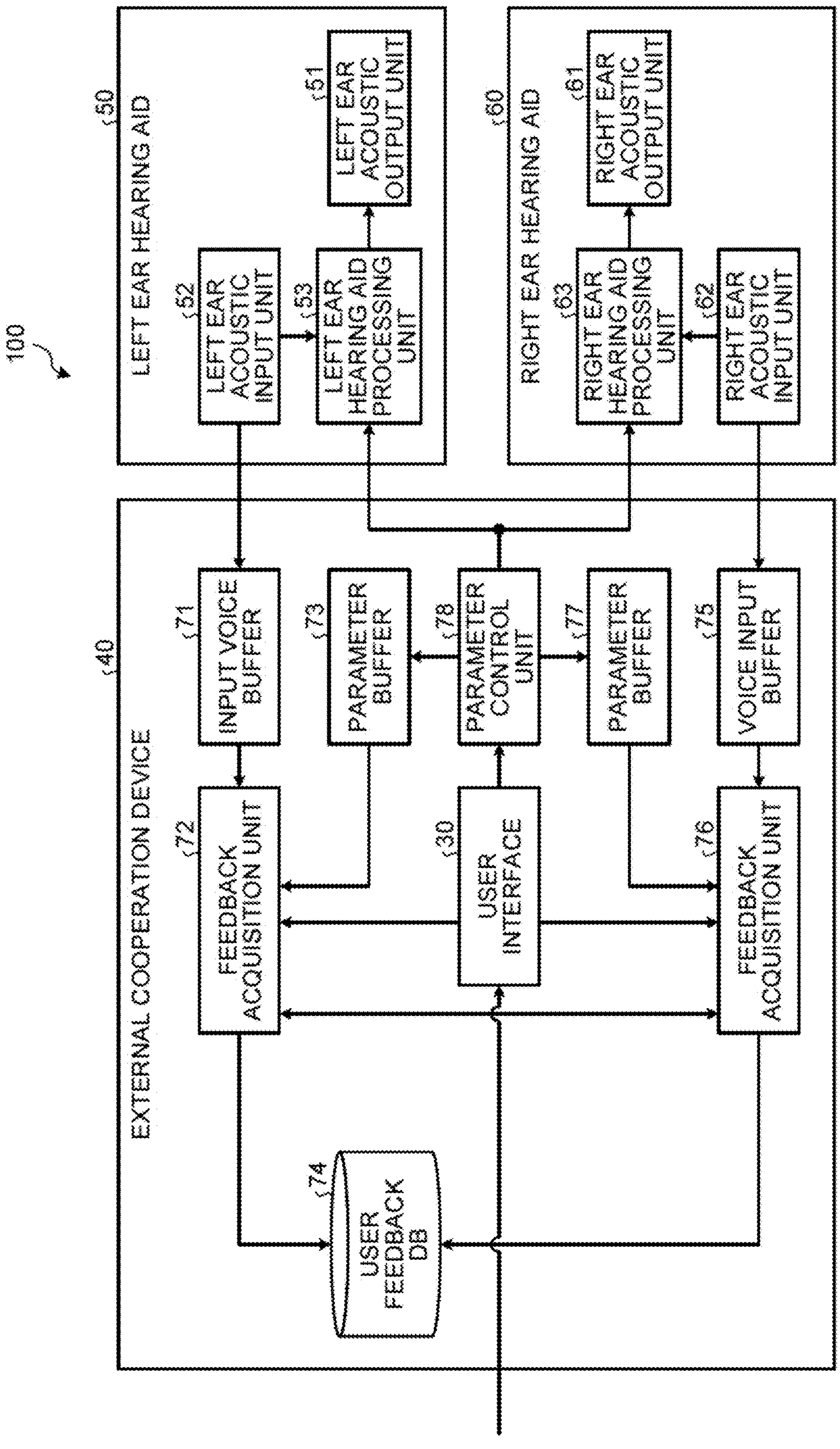
FIG. 13 is a diagram illustrating a configuration of a system including an external cooperation device and a hearing aid body according to an embodiment of the present disclosure.

FIG. 13 is a diagram illustrating a configuration of a system including the external cooperation device and the hearing aid body. As illustrated in FIG. 13, the external cooperation device 40 includes input voice buffers 71 and 75, feedback acquisition units 72 and 76, parameter buffers 73 and 77, a parameter control unit 78, a user feedback database (DB) 74, and the user interface 30. The parameter control unit 78 has the functions of the information processing system 1.

The left ear hearing aid 50 includes the left ear acoustic output unit 51, a left ear acoustic input unit 52, and a left ear hearing aid processing unit 53. The right ear hearing aid 60 includes the right ear acoustic output unit 61, a right ear acoustic input unit 62, and a right ear hearing aid processing unit 63.

The left ear hearing aid 50 and the right ear hearing aid 60 transmit input voices to the external cooperation device 40. The external cooperation device 40 stores the received voices together with time stamps in the input voice buffers (e.g., circular buffers for 60 Sec data for the left and right) 71 and 75. This communication may be always performed, or may be started on the basis of the activation of the adjustment application or an instruction from a user.

When parameter change/control by the user's operation is detected, the parameter before changing is stored in the parameter buffers 73 and 77 together with the time stamp. Thereafter, when finish of the parameter change is detected, the parameter after changing is also stored in the parameter buffers 73 and 77 together with the time stamp.

At least two parameter sets before and after the changing can be stored in the parameter buffers 73 and 77 for each ear. The finish of the parameter change may be detected, for example, when no operation is found for a predetermined time period (e.g., 5 Sec), the predetermined time period may be specified by the user himself/herself, or notification of completion of the adjustment may be performed by the user's operation.

Figure 14:
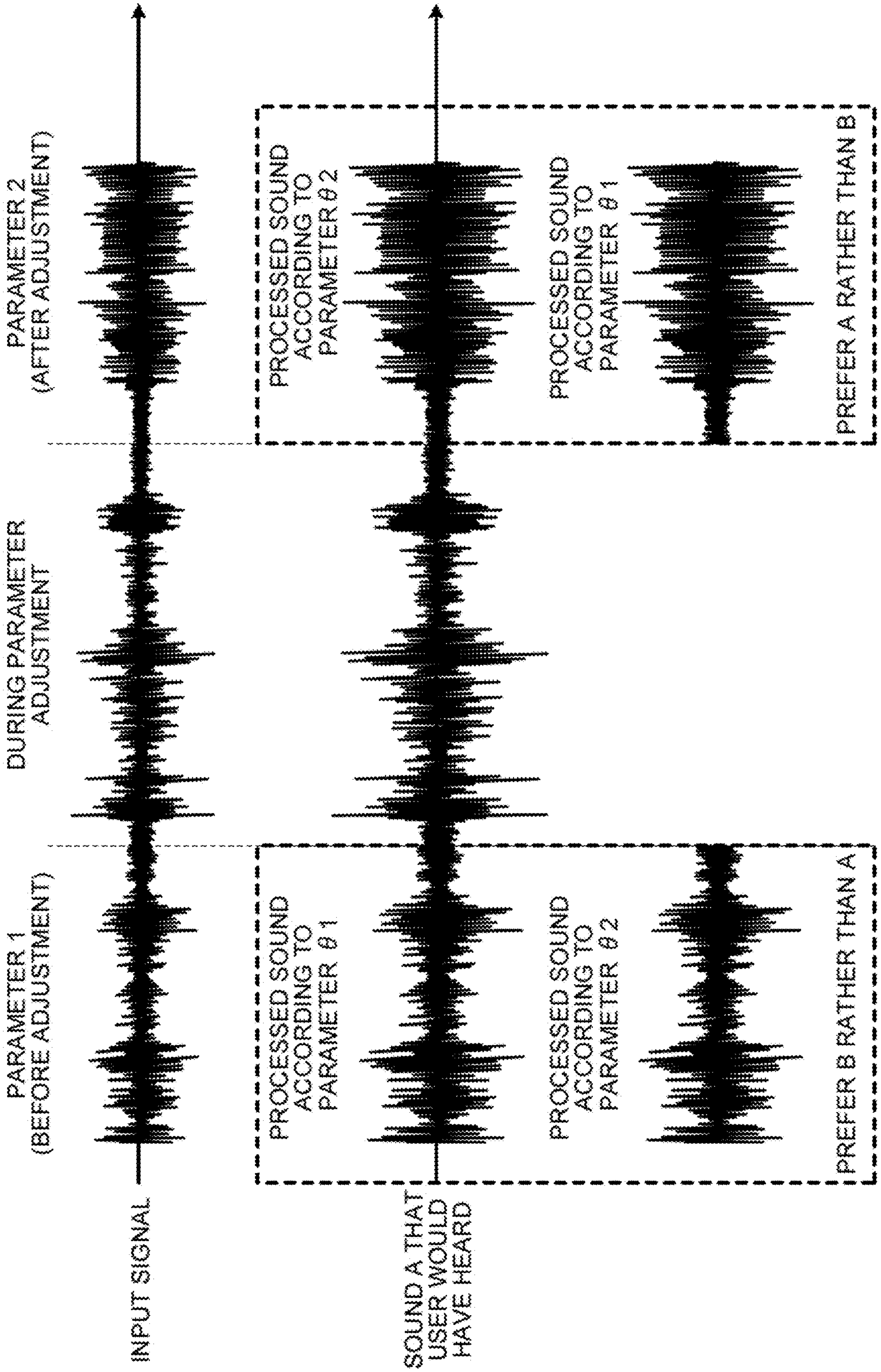
FIG. 14 is a diagram illustrating an image of feedback acquisition according to an embodiment of the present disclosure.

Once the parameter adjustment is completed, sets of voices and parameters stored in the buffers are input to the feedback acquisition units 72 and 76. FIG. 14 illustrates an image of feedback acquisition. As illustrated in FIG. 14, two sets of feedback data can be acquired from the voice inputs (before and after adjustment) and parameters (before and after adjustment), which have been stored in the buffers.

Specifically, when the user listens to the processed sound according to the parameter θ1 and then listens to the processed sound according to the parameter θ2 manually adjusted, it can be estimated that he user prefers the processed sound according to the parameter θ2 rather than the processed sound according to the parameter θ1. In other words, it can be estimated that the user prefers the parameter θ2 rather than the parameter θ1.

Therefore, the feedback acquisition units 72 and 76 can apply a label "prefers B rather than A" to the first pair of the processed sound A according to the parameter θ1 before adjustment and the processed sound B obtained by applying the parameter θ2 to an input signal as the original of the processed sound, storing the first pair in the user feedback DB 74.

Furthermore, the feedback acquisition units 72 and 76 can apply a label "prefers A rather than B" to the first pair of the processed sound A according to the adjusted parameter θ2 and the processed sound B obtained by applying the parameter θ1 to the input signal as the original of the processed sound, storing the first pair in the user feedback DB 74.

The parameter control unit 78 may use the feedback stored in the user feedback DB 74 to immediately update the reward prediction unit 12, or may use several pieces of feedback data accumulated or the feedback accumulated every predetermined period to update the reward prediction unit 12.

As described above, the adjustment unit 10 included in the parameter control unit 78 performs machine learning of the selection method for a parameter and a prediction method for the reward, on the basis of the parameters before and after manual adjustment by the user and the predicted user's reaction to the processed sounds using the parameters.

Note that, in addition to the example described here, when a sound adjustment operation is performed in a product that outputs sound, such as a television or a portable music player, the external cooperation device 40 can similarly acquire feedback data by using sounds before and after the adjustment.

[8-2. Use of Additional Property Information]

When adjusting the parameters of the hearing aid, the preferred parameter adjustment may differ depending on the situation of the user, even similar sound is input. For example, during a meeting, even if a voice remains somewhat unnatural due to a side effect of the signal processing, an output that facilitates recognition of what the people are saying is expected. Meanwhile, when the user relaxes in home, output with minimized sound quality deterioration is expected.

This means that in the reinforcement learning, the policy and the reward function differ in the behavior, depending on the user's situation. Therefore, an example is considered in which additional property information indicating "what kind of situation the user is in" is included as the state.

The additional property information includes, for example, scene information selected by the user from the user interface 30 of the external cooperation device 40, information input by voice, position information of the user measured by a global positioning system (GPS), acceleration information of the user detected by the acceleration sensor, calendar information registered in an application program managing a schedule of the user, and the like, and combinations thereof.

Figure 15:
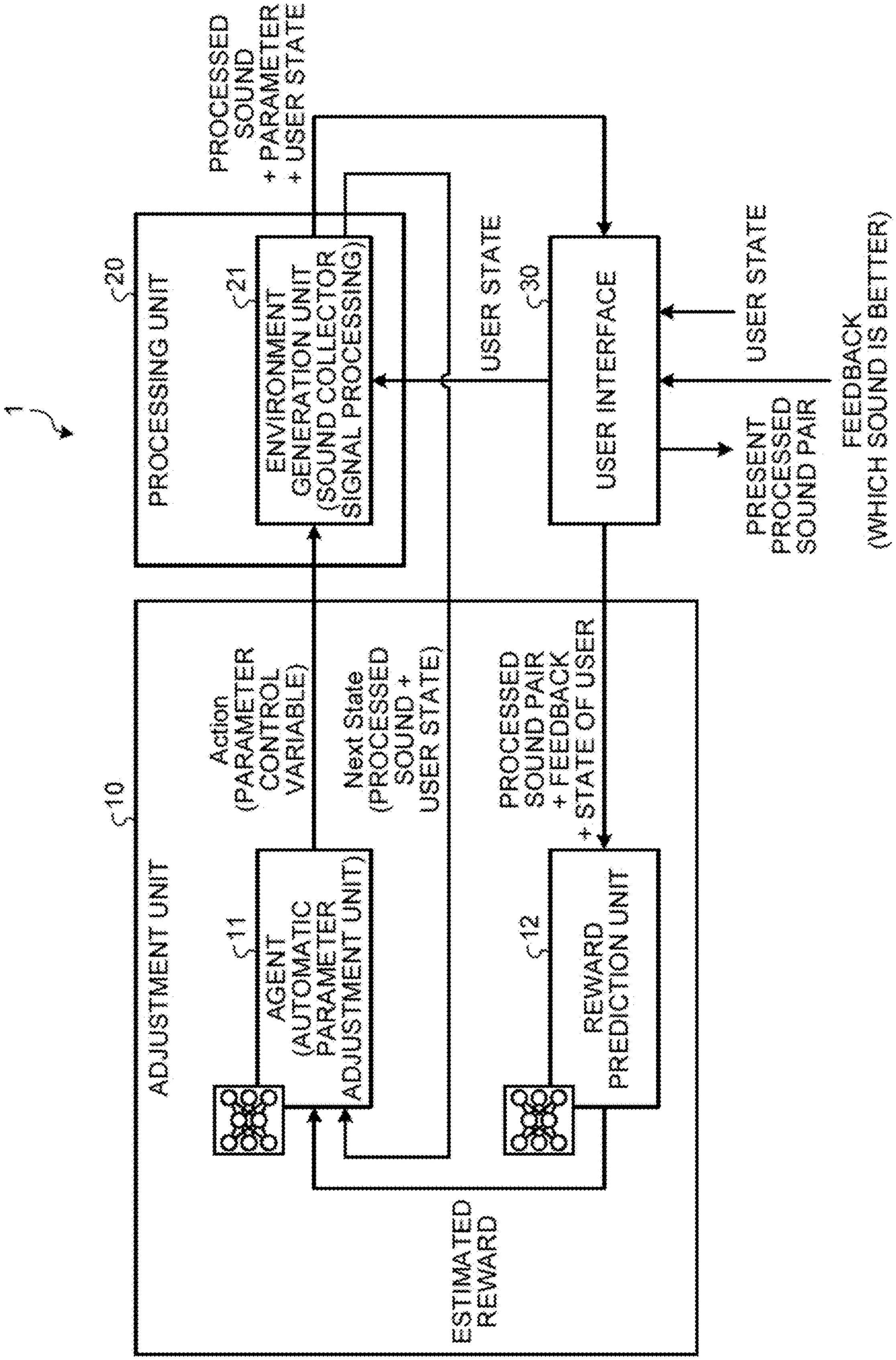
FIG. 15 is an explanatory diagram illustrating the operation of the information processing system according to an embodiment of the present disclosure.

FIG. 15 illustrates an operation of the information processing system 1 with use of the additional property information. As illustrated in FIG. 15, the user uses the user interface 30 from the adjustment application to select "in which scene adjustment is desired from now".

In the embodiments described above, the sound output from the environment generation unit 21 has been output from all sounds included in the evaluation data, at random. In the present example, sound using environmental sound that matches the scene information is output from the evaluation required data.

In this configuration, metadata indicating that the sound is used for what kind of scene needs to be added to each piece of voice data stored in the evaluation database. Data indicating the user's situation is also input to the reward prediction unit 12 and the agent 11 together with the processed sound and feedback information.

The reward prediction unit 12 and the agent 11 may have independent models according to the respective user's situations so that the models are implemented interchangeably according to the user's situation having been input or may be implemented as one model in which the user's situation is also input together with the voice input.

Figure 16:
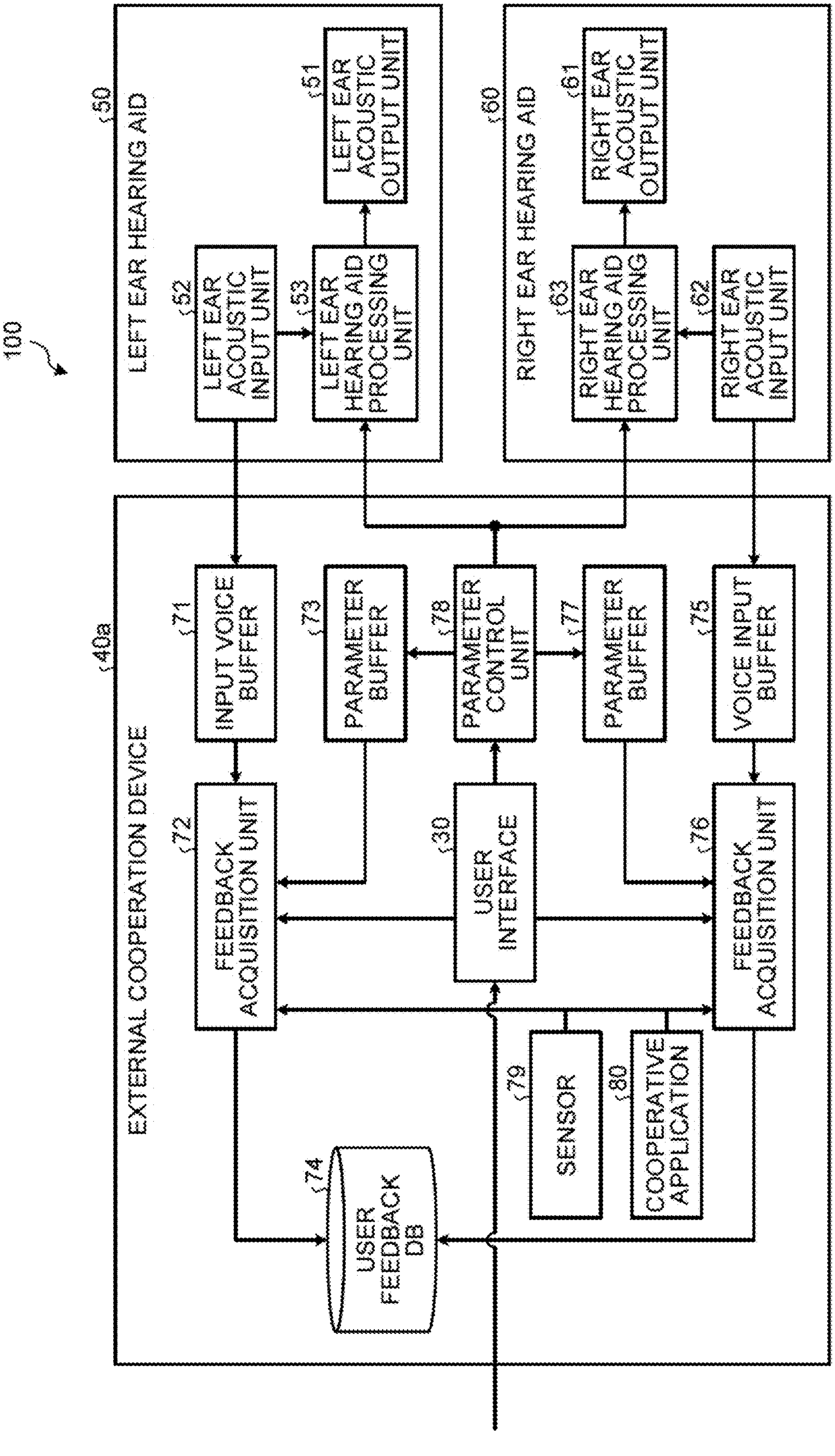
FIG. 16 is a diagram illustrating a configuration of an external cooperation device including a user situation estimation device according to an embodiment of the present disclosure.

FIG. 16 illustrates a configuration of an external cooperation device 40*a* including a user situation estimation device. The external cooperation device 40*a* is different from the external cooperation device 40 illustrated in FIG. 13 in that a sensor 79 and a cooperative application 80 are included. The sensor 79 includes, for example, a GPS sensor, an acceleration sensor, or the like.

The cooperative application 80 includes, for example, an application including the user's situation as text data or metadata, such as a calendar application or an SNS application. The sensor 79, the cooperative application 80, and the user interface 30 input the user's situation or information for estimation of the user's situation, to the feedback acquisition units 72 and 76 and the parameter control unit 78.

The feedback acquisition units 72 and 76 use the information to classify the user's situation into any of categories prepared in advance, and store the classified information added to the voice input and the user feedback information in the user feedback DB 74.

Note that the feedback acquisition units 72 and 76 may detect a scene from the voice input stored in the buffer. In the parameter control unit 78, an appropriate parameter is selected by the agent 11 and the reward prediction unit 12 that have been subjected to machine learning for each of the classified categories.

[8-3. Reliability (Weighting) of Feedback Data]

In addition to the additional profile information as described above, reliability for each piece of feedback data may be added. For example, not all data is input at a uniform probability as the training data upon training of the reward prediction unit 12, but the data may be input at a ratio according to the reliability.

For example, the reliability may adopt a predetermined value according to a source from which the feedback data is obtained, such as setting the reliability to 1.0 when the data is obtained from the A/B test, or such as setting the reliability to 0.5 when the data is obtained by indirect feedback (reaction) from the adjustment of the smartphone.

Alternatively, the reliability may be determined from the surrounding situation or the user's situation upon adjustment. For example, in a case where the A/B test is conducted in a noisy environment, surrounding noise may become masking sound, hindering user's appropriate feedback.

Therefore, such a method may be used in which an average equivalent noise level or the like of the ambient sound is calculated every several seconds, and when the average equivalent noise level is equal to or more than a first threshold and less than a second threshold higher than the first threshold, the reliability is set to 0.5, when the average equivalent noise level is equal to or more than the second threshold and less than a third threshold higher than the third threshold, the reliability is set to 0.1, and when the average equivalent noise level is equal to or more than the third threshold, the reliability is set to 0.

[8-4. In-Situ Automatic Fitting]

In the examples described above, the use case has been described in which the user interface 30 illustrated in FIG. 12 has been used to perform parameter adjustment and the obtained information has been used for reward prediction. However, not all parameters of the hearing aid can be adjusted by the user interface 30 illustrated in FIG. 12.

In the first place, the manual parameter adjustment for a large number of parameters is complicated and difficult for the user to perform. There is also a use case where in-situ adjustment is automatically performed. Therefore, in the information processing system 1, the manual parameter adjustment and automatic parameter adjustment can be combined.

Figure 17:
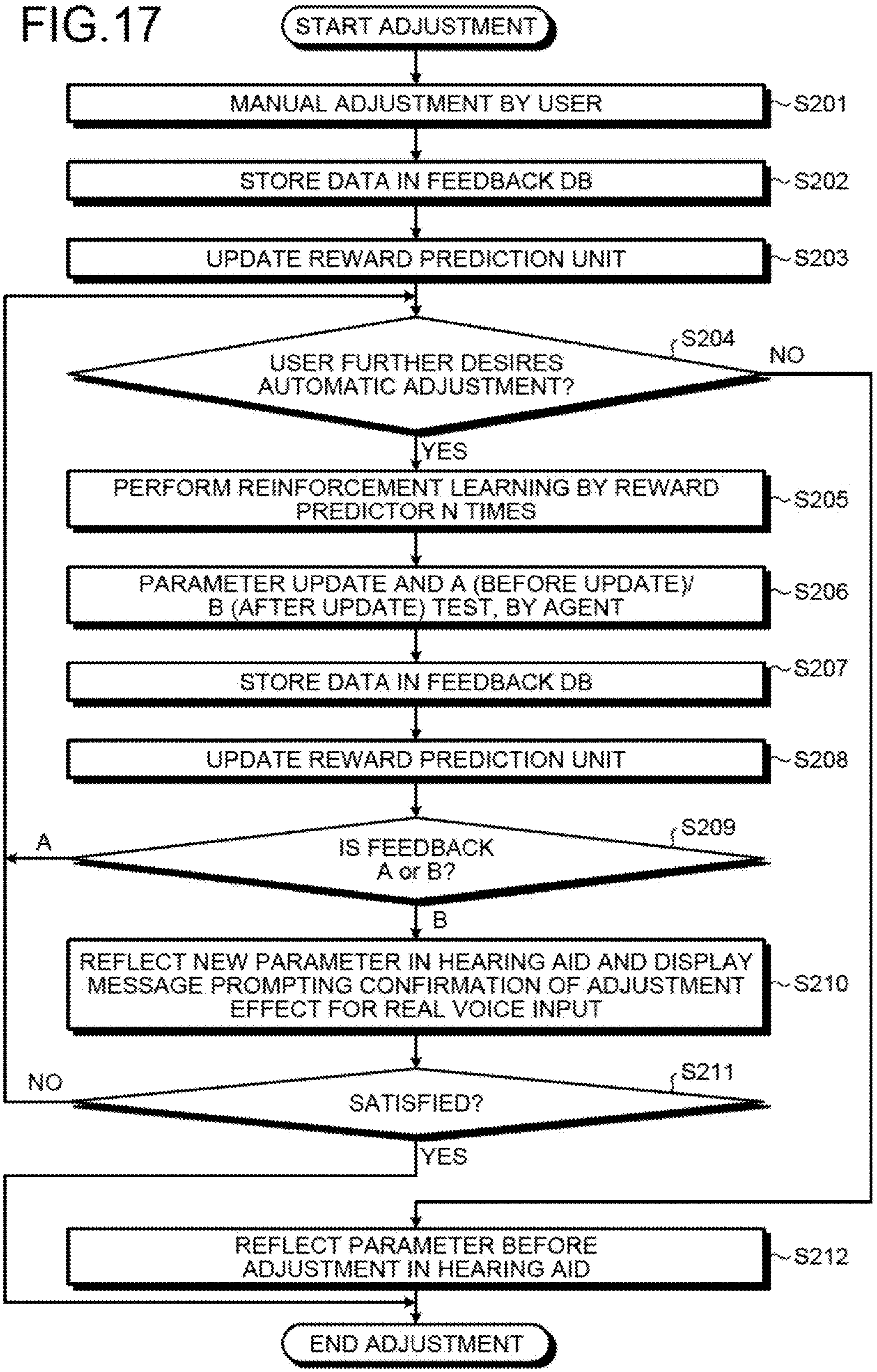
FIG. 17 is a flowchart illustrating an example of a process performed by the information processing system according to an embodiment of the present disclosure.

In this configuration, the information processing system 1 performs, for example, the process illustrated in FIG. 17. Specifically, as illustrated in FIG. 17, when the adjustment application is activated, the information processing system 1 first causes the user to perform manual adjustment (Step S201), and stores a result of the adjustment in the user feedback DB 74 (Step S202).

Subsequently, the information processing system 1 updates the reward prediction unit 12 (Step S203), and determines whether the user further desires automatic adjustment (Step S204). Then, when the information processing system 1 determines that the user does not desire further automatic adjustment (Step S204, No), the information processing system 1 reflects the parameter before adjustment in the hearing aid (Step S212), and finishes the adjustment.

Furthermore, when the information processing system 1 determines that the user desires further automatic adjustment (Step S204, Yes), the information processing system 1 performs reinforcement learning (Steps S107 to S111 illustrated in FIG. 11) by the reward prediction unit 12 N times (N is any set natural number.) (Step S205).

Subsequently, the information processing system 1 performs parameter update by the agent 11 and the A (before update)/B (after update) test (Step S206), stores the result in the user feedback DB 74 (Step S207), and updates the reward prediction unit 12 (Step S208).

Thereafter, the information processing system 1 determines whether the feedback indicates A (before update) or B (after update) (Step S209). Then, when the feedback is A (before update) (Step S209, A), the information processing system 1 proceeds to Step S204.

Furthermore, when the feedback indicates B (after update) (Step S209, B), the information processing system 1 reflects a new parameter in the hearing aid and displays a message prompting confirmation of an adjustment effect for a real voice input (Step S210).

Thereafter, the information processing system 1 determines whether the user is satisfied (Step S211), and when it is determined that the user is not satisfied (Step S211, No), the process proceeds to Step S204. Furthermore, when it is determined that the user is satisfied (Step S212, Yes), the information processing system 1 finishes the adjustment.

[8-5. Use of Information About Adjustment by Audiologist]

There is a use case in which the audiologist is requested to adjust the hearing aid instead of completely depending on the automatic adjustment. The following configuration makes it possible to automatically adjust the parameters by further using information about adjustment by the audiologist.

Advantages of use of information about the adjustment by the audiologist are as follows. For example, from the viewpoint of hearing protection, in the example described above, "−2, +1, +4 are added to the parameter on the basis of the adjustment values, for each band of the compressor," but in an actual use case, the effect may not be obtained unless an adjustment range is wider, in some cases. However, permission of the same adjustment width to any user causes a problem in terms of hearing protection.

In addition, from the viewpoint of habituation to hearing aid, a user who is not used to wearing the hearing aid tends to prefers a lower amplification degree rather than an appropriate value that the audiologist considers. Therefore, in general, a process is taken to gradually approach an appropriate value that the audiologist considers, from a difference between the user's preference and the appropriate value that the audiologist considers, over time, and the user is used to hearing the hearing aid little by little. Alternatively, some hearing aid stores that forcibly recommend the appropriate value the audiologists consider.

Taking advantage of these benefits, for example, in a case where the parameter has a clear range "that must be maintained," the possible range of actions is clearly set. In the example described above, "−2, +1, +4 are added to the parameter on the basis of the adjustment values, for each band of the compressor," but the present invention can be implemented by changing a set of values from (−2, +1, +4) to (0, +2, +4, +6, +8, +10), (−4, −2, 0, +2), or the like. Note that the parameter setting value may be changed for each band. Especially, from the viewpoint of hearing protection, it is effective to use this approach.

Although it is not possible to determine a clear parameter range, but in a case where "an element that the audiologist thinks good is desired to be incorporated into adjustment," it is preferable to constitute the reward prediction unit 12 according to the audiologist, separately from the user reward prediction.

For example, in a case where "If the user strongly desires +5 as the compressor parameter, the parameter can be set to +5, but the audiologist considers that the appropriate value is likely to be located at or below +4," a modified prediction reward such as the following formula (8) is used.

$$rtotal = ruser + raudi \tag{8}$$

Here, rtotal is a reward used for learning, ruser is an output from the reward prediction unit 12, and raudi may use a function such as raudi=−β/exp(+a(x−4))1 that gently reduces the reward when a set value x of the parameter exceeds +4. If the evaluation on a result of implicit adjustment by the audiologist is used, raudi may be trained similarly to the ruser.

In addition, a result of adjustment at the store, the parameters before and after adjustment obtained by remote fitting, and the processed sound used for trial listening to confirm the effect may be stored in the user feedback DB 74 and used as data for reinforcement learning, instead of providing a special mechanism for taking in a result of adjustment by the audiologist.

[8-6. Example in Which Data of Plurality of Users is Aggregated and Used]

Hitherto, use of only personal data for adjustment of the hearing aid of an individual user has been described, but a service provider can also aggregate data of a plurality of users to improve the quality of an automatic adjustment function of each user.

Figure 18:
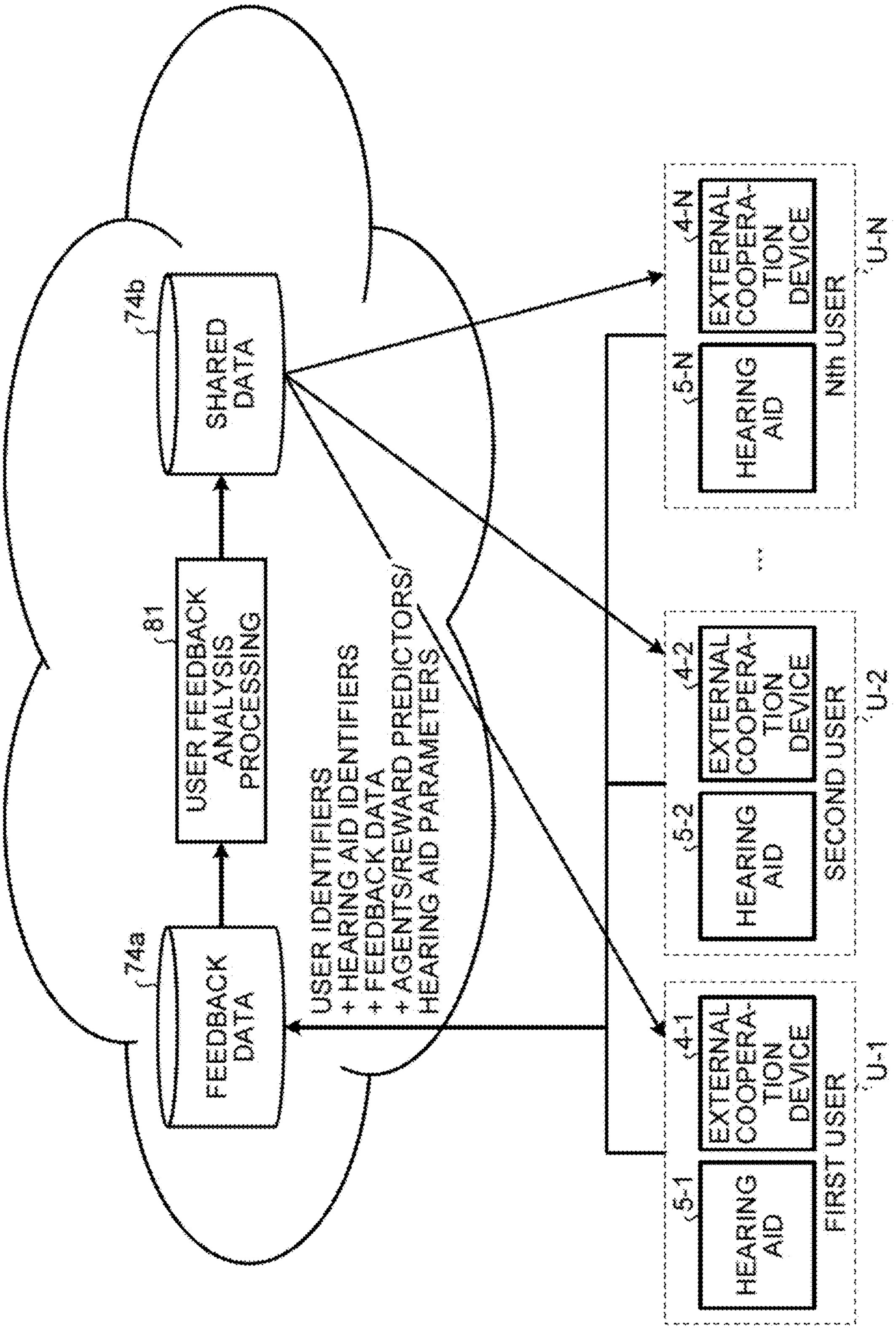
FIG. 18 is a diagram illustrating a configuration of a data aggregation system according to an embodiment of the present disclosure.

The present example is based on the assumption that "users with similar personal profiles and hearing loss symptoms should have similar reward functions and preferred adjustment parameters". FIG. 18 illustrates a schematic system configuration according to the present example.

An infinite number of pieces of feedback data are accumulated in external cooperation devices 4-1 to 4-N of users, that is, a first user U-1 to N-th user U-N illustrated in FIG. 18, by using the adjustment function described above.

Sets of the feedback data, user identifiers, the identifiers of the hearing aids 5-1 to 5-N used in collecting the feedback data, the parameters of the agent 11 and reward prediction unit 12 in the reinforcement learning, adjusted parameters of the hearing aids 5-1 to 5-N, and the like are uploaded to a feedback database 74*a* on a server.

The external cooperation devices 4-1 to 4-N are directly connected to a wide area network (WAN), and data may be uploaded in the background, or the data may be transferred to an external device such as another personal computer once and then uploaded. It is assumed that the feedback data includes the property information described in [8-2. Use of additional property information].

For example, a user feedback analysis processing unit 81 uses information such as "native language, age group, use scene" directly or performs clustering in a space using audiogram information as a feature vector (e.g., k-means clustering) to classify the users into a predetermined number of classes to classify various aggregated information.

Information (e.g., property information itself, an average value of each class of the clustered audiogram, etc.) characterizing the classification itself, and all or part of or a representative value or statistic of the classified feedback data and user data are stored in a shared DB 74*b*.

As the representative value, an addition average for each classification or data of an individual closest to the median value in the audiogram feature space may be used, or the reward prediction unit 12 or the agent 11 which are retrained by using feedback data of all classified users or some users close to the median value may be used. For learning itself, the method described in the example above is adapted to the data of the plurality of users.

One of specific applications of the shared DB 74*b* obtained in this manner is data sharing for a user who has just started using the hearing aid. In the examples described above, an initial value of the compressor parameter has been a value calculated from the fitting formula based on the audiogram. However, in the present example, instead, a representative value of the classes classified based on user profiles or the closest user data in the same classification may be used as the initial value. The same applies not only to the initial values of the adjustment parameters but also to the initial values of the agent 11 and reward prediction unit 12.

A second specific application is use in the adjustment process. By randomly adopting adjustment parameters of the same user class at a predetermined frequency, in addition to the parameter update by the action output from the agent 11, it is possible to expect an effect of preventing convergence to a local solution or accelerating the discovery of a better solution.

[8-7. Another Exemplary Configuration of Adjustment System]

In FIGS. 9, 13, and 16, an example in which the input voice buffers, the parameter buffers, the feedback acquisition units 72 and 76, and the like are provided independently for the left and right hearing aids has been described. This is because many hearing aid users wear hearing aids on both ears, the symptoms of hearing loss are different between the left and right ears, and independent compressor parameters are required.

In a case where the user is a monaural hearing aid wearer, the monaural hearing aid can be implemented by a configuration for one ear. Parameters for hearing aid signal processing other than the compressor include, for example, a parameter that is common to the left and right, and parameters that are different from each other but that should be adjusted simultaneously, such as parameters for noise suppression.

Figure 19:
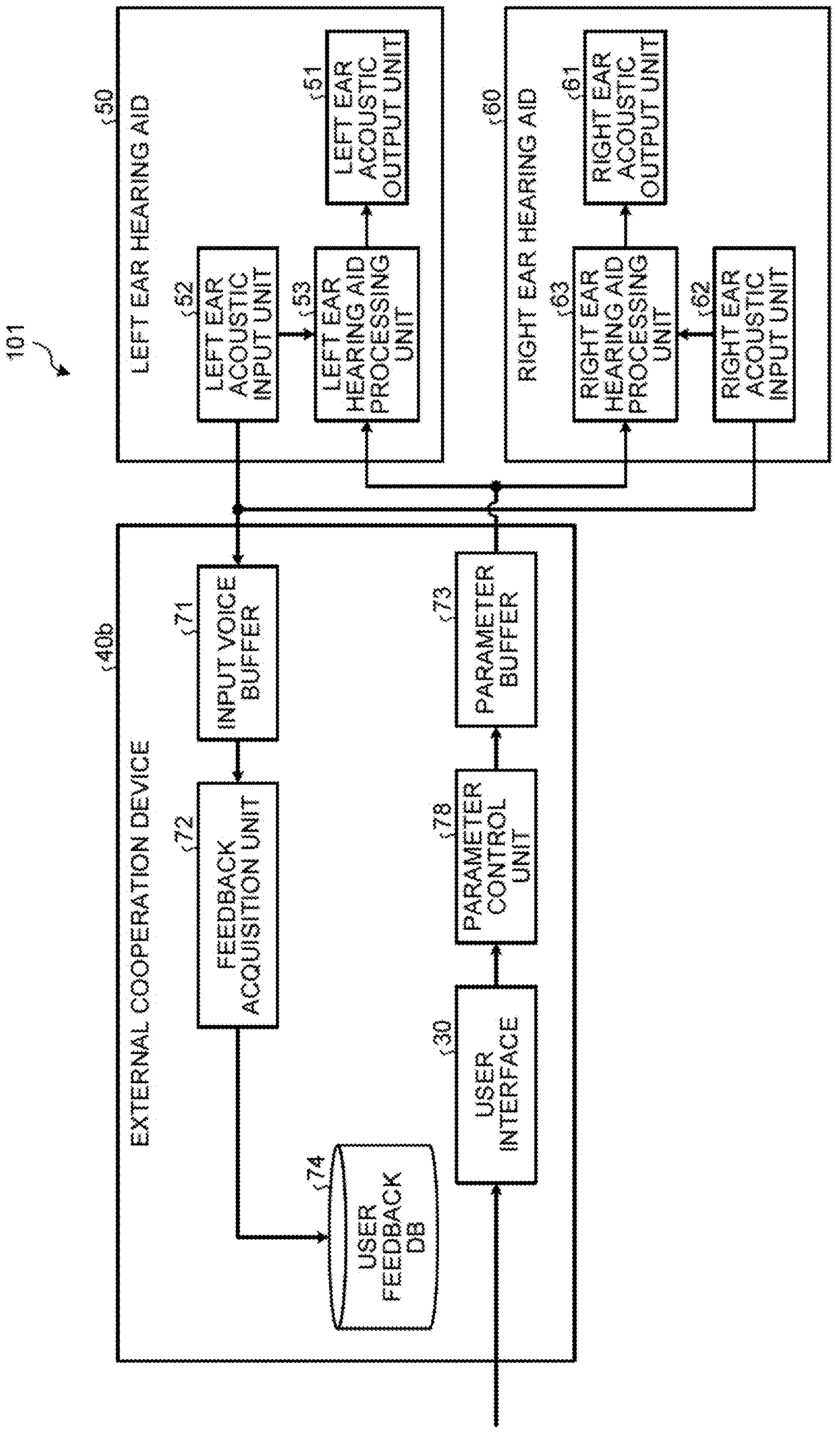
FIG. 19 is a diagram illustrating another exemplary configuration of the adjustment system according to an embodiment of the present disclosure.

When such signal processing is included in the target for automatic adjustment, management of the feedback data needs to be performed for both left and right ears together. In this case, for example, as in an adjustment system 101 illustrated in FIG. 19, an external cooperation device 40*b* may have a configuration in which the input voice buffer 71 and the feedback acquisition unit 72 are shared by the left ear hearing aid 50 and the right ear hearing aid 60.

Note that all of the functions of the external cooperation devices 40, 40*a*, and 40*b* may be included in the hearing aid. For example, the left ear hearing aid processing unit 20L and the right ear hearing aid processing unit 20R, which are an example of the processing unit, and the adjustment unit 10 may be mounted on the hearing aid. Alternatively, the left ear hearing aid processing unit 20L, the right ear hearing aid processing unit 20R, and the adjustment unit 10 may be mounted on a terminal device such as the external cooperation device 40 that outputs signal data of the processed sound to the hearing aid.

Furthermore, instead of storing all past data in the user feedback DB 74, recent data may be cached and the database of the main body may on the cloud. Furthermore, each drawing described so far is merely an example, and does not limit the location of each component according to the present disclosure.

Note that the effects described herein are merely examples and are not limited to the description, and other effects may be provided.

Note that the present technology can also have the following configurations.

(1)

An information processing method for an information processing system including:

a processed sound generation step of generating a processed sound by acoustic processing using a parameter changing a sound collection function or a hearing aid function of a sound output unit; and an adjustment step of adjusting the sound output unit according to a parameter selected based on the parameter used for the acoustic processing and feedback on the processed sound output from the sound output unit.

(2)

The information processing method according to (1), wherein in the adjustment step, machine learning of a selection method for the parameter suitable for a user is performed based on the parameter used for the acoustic processing and feedback on the processed sound output from the sound output unit, and the sound output unit is adjusted according to a parameter selected by the selection method.

(3)

The information processing method according to (2), wherein in the adjustment step, the parameter used for the acoustic processing and feedback on the processed sound output from the sound output unit are acquired to perform machine learning of a prediction method of predicting, as a reward, feedback on processed sound generated by acoustic processing using any parameter; and the parameter that maximizes the predicted reward is selected.

(4)

The information processing method according to any one of (1) to (3), further including a processed sound output step of outputting the processed sound by the sound output unit.

(5)

The information processing method according to (4), wherein in the processed sound output step, the sound output unit outputs at least two types of processed sounds having different parameters used for the acoustic processing, and in the adjustment step, the parameters used for the acoustic processing of the at least two types of processed sounds, and feedback on the at least two types of processed sounds output from the sound output unit are acquired.

(6)

The information processing method according to (5), further including:

a display step of displaying a speaker that speaks the processed sounds; and a selection receiving step of receiving an operation of selecting a preferred processed sound from the at least two types of processed sounds.

(7)

The information processing method according to (5), further including:

a display step of displaying a speaker that speaks the processed sounds; and a selection receiving step of receiving a slider operation selecting favorable sensitivity to the at least two types of processed sounds.

(8)

The information processing method according to (3), wherein in the adjustment step, a result of manual adjustment of the parameter by a user who has listened to the output processed sound is acquired to perform machine learning of a selection method for the parameter and a prediction method for the reward, based on a result of the adjustment.

(9)

The information processing method according to (8), wherein in the adjustment step, machine learning of the selection method for the parameter and the prediction method for the reward is performed, based on parameters before and after the manual adjustment by the user and a predicted reaction of the user to the processed sound using the parameters.

(10)

The information processing method according to (9), wherein in the adjustment step, machine learning of the selection method for the parameter and the prediction method for the reward is performed, based on feedback of the user to which reliability is added according to whether the feedback of the user is an actual reaction or the predicted reaction.

(11)

The information processing method according to (3), wherein in the adjustment step, a situation of the user who has listened to the output processed sound is estimated to perform machine learning of the selection method for the parameter and the prediction method for the reward, for each situation of the user.

(12)

The information processing method according to (11), wherein in the adjustment step, the situation of the user is estimated from at least any one of information input by an operation or voice of the user, position information of the user measured by a global positioning system (GPS), acceleration information of the user detected by an acceleration sensor, and calendar information registered in an application program managing a schedule of the user.

(13)

The information processing method according to (11) or (12), wherein in the adjustment step, the sound output unit is adjusted according to a parameter depending on the situation of the user.

(14)

The information processing method according to (3), wherein in the adjustment step, the parameter used for the acoustic processing and feedback on the processed sound, from a plurality of users who has listened to the processed sound are acquired to perform machine learning of the selection method for the parameter and the prediction method for the reward.

(15)

The information processing method according to (14), wherein in the adjustment step, the parameter and feedback of the plurality of users are acquired from a server that stores the parameter used for the acoustic processing and the feedback for the processed sounds of the plurality of users who has listened to the processed sounds.

(16)

The information processing method according to (14) or (15), wherein in the adjustment step, a plurality of users acquiring the feedback is selected, based on a similarity to the user who uses the sound output unit of a target for adjustment.

(17)

The information processing method according to any one of (1) to (16), wherein in the adjustment step, for the parameter related to noise suppression, the same parameter is selected for a right ear hearing aid and a left ear hearing aid; and for the parameters other than noise suppression, the parameters are individually selected for the right ear hearing aid and the left ear hearing aid.

(18)

An information processing system including:

a processing unit that generates a processed sound by acoustic processing using a parameter changing a sound collection function or a hearing aid function of a sound output unit; and an adjustment unit that adjusts the sound output unit according to a parameter selected based on the parameter used for the acoustic processing and feedback on the processed sound output from the sound output unit.

(19)

The information processing system according to (18), further including a sound output unit that outputs the processed sound.

(20)

The information processing system according to (18) or (19), wherein the sound output unit is a hearing aid, and the processing unit and the adjustment unit are mounted to the hearing aid or a terminal device that outputs signal data of the processed sound to the hearing aid.

REFERENCE SIGNS LIST

1 INFORMATION PROCESSING SYSTEM
10 ADJUSTMENT UNIT
11 AGENT
12 REWARD PREDICTION UNIT
20 PROCESSING UNIT
30 USER INTERFACE
40 EXTERNAL COOPERATION DEVICE
50 LEFT EAR HEARING AID
60 RIGHT EAR HEARING AID

The invention claimed is:

1. An information processing method for an information processing system comprising:

a processed sound generation step of generating a processed sound output comprising a first processed sound and a second processed sound different from the first processed sound by acoustic processing using a parameter changing a sound collection function or a hearing aid function of a sound output unit;

receiving feedback on the first processed sound and the second processed sound, the feedback comprising a comparison between the first processed sound and the second processed sound; and an adjustment step of adjusting the sound output unit according to a parameter selected based on the parameter used for the acoustic processing and the feedback on the first processed sound and the second processed sound output from the sound output unit.

2. The information processing method according to claim 1, wherein in the adjustment step, machine learning of a selection method for the parameter suitable for a user is performed based on the parameter used for the acoustic processing and feedback on the processed sound output from the sound output unit, and the sound output unit is adjusted according to a parameter selected by the selection method.

3. The information processing method according to claim 2, wherein in the adjustment step, the parameter used for the acoustic processing and feedback on the processed sound output from the sound output unit are acquired to perform machine learning of a prediction method of predicting, as a reward, feedback on processed sound generated by acoustic processing using any parameter; and the parameter that maximizes the predicted reward is selected.

4. The information processing method according to claim 3, wherein in the adjustment step, a result of manual adjustment of the parameter by a user who has listened to the processed sound output is acquired to perform machine learning of a selection method for the parameter and a prediction method for the reward, based on a result of the adjustment.

5. The information processing method according to claim 4, wherein in the adjustment step, machine learning of the selection method for the parameter and the prediction method for the reward is performed, based on parameters before and after the manual adjustment by the user and a predicted reaction of the user to the processed sound output using the parameters.

6. The information processing method according to claim 5, wherein in the adjustment step, machine learning of the selection method for the parameter and the prediction method for the reward is performed, based on feedback of the user to which reliability is added according to whether the feedback of the user is an actual reaction or the predicted reaction.

7. The information processing method according to claim 3, wherein in the adjustment step, a situation of the user who has listened to the processed sound output is estimated to perform machine learning of the selection method for the parameter and the prediction method for the reward, for each situation of the user.

8. The information processing method according to claim 7, wherein in the adjustment step, the situation of the user is estimated from at least any one of information input by an operation or voice of the user, position information of the user measured by a global positioning system (GPS), acceleration information of the user detected by an acceleration sensor, and calendar information registered in an application program managing a schedule of the user.

9. The information processing method according to claim 7, wherein in the adjustment step, the sound output unit is adjusted according to a parameter depending on the situation of the user.

10. The information processing method according to claim 3, wherein in the adjustment step, the parameter used for the acoustic processing and feedback on the processed sound output, from a plurality of users who have listened to the processed sound output are acquired to perform machine learning of the selection method for the parameter and the prediction method for the reward.

11. The information processing method according to claim 10, wherein in the adjustment step, the parameter and feedback of the plurality of users are acquired from a server that stores the parameter used for the acoustic processing and the feedback for the processed sounds of the plurality of users who has listened to the processed sounds.

12. The information processing method according to claim 10, wherein in the adjustment step, a plurality of users acquiring the feedback is selected, based on a similarity to the user who uses the sound output unit of a target for adjustment.

13. The information processing method according to claim 1, further comprising a processed sound output step of outputting the processed sound by the sound output unit.

14. The information processing method according to claim 13, further comprising:

a display step of displaying a speaker that speaks the first processed sound and the second processed sound; and a selection receiving step of receiving an operation of selecting a preferred processed sound from the first processed sound and the second processed sound.

15. The information processing method according to claim 13, further comprising:

a display step of displaying a speaker that speaks the first processed sound and the second processed sound; and a selection receiving step of receiving a slider operation selecting favorable sensitivity to the first processed sound and the second processed sound.

16. The information processing method according to claim 1, wherein in the adjustment step, for the parameter related to noise suppression, the same parameter is selected for a right ear hearing aid and a left ear hearing aid; and for the parameters other than noise suppression, the parameters are individually selected for the right ear hearing aid and the left ear hearing aid.

17. An information processing system comprising:

a processing unit that:

generates a processed sound output comprising a first processed sound and a second processed sound by acoustic processing using a parameter changing a sound collection function or a hearing aid function of a sound output unit; and receives feedback on the first processed sound and the second processed sound, the feedback comprising a comparison between the first processed sound and the second processed sound; and an adjustment unit that adjusts the sound output unit according to a parameter selected based on the parameter used for the acoustic processing and the feedback on the first processed sound and the second processed sound output from the sound output unit.

18. The information processing system according to claim 17, further comprising a sound output unit that outputs the processed sound output.

19. The information processing system according to claim 18, wherein the sound output unit is a hearing aid, and the processing unit and the adjustment unit are mounted to the hearing aid or a terminal device that outputs signal data of the processed sound output to the hearing aid.

* * * * *